(12) United States Patent
Bonin

(10) Patent No.: US 8,189,300 B1
(45) Date of Patent: May 29, 2012

(54) MULTI-LAYER CAPACITIVE TRANSDUCER WITH MULT-DIMENSION OPERATION

(76) Inventor: Wayne Allen Bonin, North Oaks, MN (US)

( * ) Notice: Subject to any disclaimer, the term of this patent is extended or adjusted under 35 U.S.C. 154(b) by 0 days.

(21) Appl. No.: 12/930,311

(22) Filed: Jan. 3, 2011

Related U.S. Application Data

(60) Continuation-in-part of application No. 11/906,444, filed on Oct. 1, 2007, now Pat. No. 7,864,504, which is a division of application No. 11/432,893, filed on May 12, 2006, now Pat. No. 7,277,267, which is a continuation of application No. 10/849,363, filed on May 17, 2004, now Pat. No. 7,046,497.

(60) Provisional application No. 60/470,774, filed on May 15, 2003.

(51) Int. Cl.
*H01G 5/16* (2006.01)

(52) U.S. Cl. ........ 360/290; 361/277; 361/280; 361/281; 73/780

(58) Field of Classification Search ................. None
See application file for complete search history.

(56) References Cited

U.S. PATENT DOCUMENTS

| | | | | | |
|---|---|---|---|---|---|
| 5,383,364 | A | * | 1/1995 | Takahashi et al. | 73/514.32 |
| 5,437,196 | A | * | 8/1995 | Okada | 73/862.043 |
| 5,492,020 | A | * | 2/1996 | Okada | 73/862.626 |
| 5,553,486 | A | * | 9/1996 | Bonin | 73/105 |
| 5,576,483 | A | * | 11/1996 | Bonin | 73/105 |
| 6,820,493 | B1 | * | 11/2004 | Bonin | 73/780 |
| 6,960,945 | B1 | * | 11/2005 | Bonin | 327/111 |

* cited by examiner

*Primary Examiner* — Eric Thomas
*Assistant Examiner* — Dion Ferguson

(57) ABSTRACT

A capacitive transducer of multi-layer construction includes at least one rotor plate supported by flexible springs, A number of improvements are disclosed including a hollow rotor plate structure for reduced moving mass, buckling resistant features for the springs, improved spring anchor joint design for reduced creep and hysteresis, and material selection and matching for reduced thermal sensitivity. one embodiment allows measurement of force and/or displacement in multiple directions.

12 Claims, 25 Drawing Sheets

MULTI-LAYER CAPACITIVE TRANSDUCER WITH MULT-DIMENSION OPERATION

CROSS-REFERENCE TO RELATED APPLICATIONS

This application is a continuation-in-part of application Ser. No. 11/906,444, filed Oct. 1, 2007, now U.S. Pat. No. 7,864,504, which is a divisional of 11/432,893, filed May 12, 2006, now U.S. Pat. No. 7,277,267, which is a continuation of Ser. No. 10/849,363, filed May 17, 2004, now U.S. Pat. No. 7,046,497, which claims priority from Provisional Application 60/470,774, filed May 15, 2003.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

This invention relates to capacitive transducers, for example for use in displacement and force-responsive devices Capacitive transducers use various configurations of capacitor electrodes along with springs, diaphragms or other support mechanisms to sense acceleration, force, weight, pressure, displacement or position. Capacitive transducers have much higher output signal than strain gauge transducers, giving them a significant advantage in signal to noise ratio (SNR) and reduced susceptibility to drift from offset voltages in the circuitry, and thermocouple effects in the wiring, but capacitive transducers also generally have a much higher impedance than strain gauge transducers. The higher impedance will degrade the SNR if the transducer drive circuitry is not optimized for the high impedance transducer. Bonin, in U.S. Pat. No. 6,960,945 titled "High-Performance Drive Circuitry For Capacitive Transducers" discusses the drive circuit in detail. The current discussion pertains mainly to aspects of the transducer itself, and only a basic discussion of the circuitry, to aid in understanding the operation of the transducer, will be presented here.

Capacitive transducers operate by sensing the change in capacitance between two or more electrodes caused by a change in position of at least one electrode. By calibrating the readout circuitry accordingly, the output signal may be adjusted to represent the displacement directly, or, in cooperation with springs or other support structure attached to the moving electrode, the output may represent acceleration, force (including weight), or pressure. Capacitive transducers may also generate a force by applying a voltage between two or more electrodes, causing an attractive force between the electrodes proportional to the square of the electric field strength. The force is generally small, on the order of 1 gram for transducers 12 mm in size, but is very useful in certain precision instruments operating with a maximum required force in that range.

Many possible circuits may be used to convert the change in transducer capacitance to a voltage that represents the desired function being measured. The most suitable circuitry for operating capacitive transducers applies an AC carrier or drive signal to one or more drive electrodes, and synchronously demodulates a signal on a pickup electrode to remove the carrier frequency and convert the output to a DC voltage that is representative of the electrode spacing. Ideally the output voltage is a linear function of the electrode spacing or deflection, and is not effected by anything other than the electrode spacing. In practice there are many factors that tend to introduce errors to the output voltage, such as temperature sensitivities in gain and offset voltage, non-linearity, noise, parasitic capacitance, and mechanical imperfections in the transducer. This discussion will be concerned mainly with those aspects directly related to the transducer, with those aspects more directly related to the drive circuitry being discussed in the previously referenced Bonin U.S. Pat. No. 6,960,945. Discussion of the circuitry as required to understand the basic operation of the transducer, as well as the improvements of the current transducer is included.

A prior art capacitive transducer containing three electrodes is described by Bonin in U.S. Pat. No. 5,576,483, "Capacitive Transducer with Electrostatic actuation" issued Nov. 19, 1996. This transducer has a high resolution for measuring displacement and force, but it has several significant problems and limitations that are reduced or eliminated in the transducer of the current invention. FIG. 1 is a simplified exploded view of the prior art transducer. FIG. 2A is a schematic/block diagram of the prior art transducer with the associated electronic circuitry, and FIG. 2B is an electrical schematic representation of the transducer. FIG. 3 is a cross section of the prior art transducer, with the Z-axis scale distorted to show more clearly the thin components of the transducer.

The transducer of the 483 patent includes pickup electrode 29 suspended by springs 30 which are attached to frame 31. Tab 32 is provided for electrical connection to output signal detector/conditioner 37. Pickup electrode assembly 28 consists of previously mentioned pickup electrode 29, springs 30, frame 31, and tab 32. Although referred to as an assembly due to inclusion of a number of parts performing different functions, pickup electrode assembly 28 is generally formed from a single sheet of high strength conductive material, such as a commercially available BeCu alloy. Load button 33 is attached to drive electrode 29, providing for interaction with a sample of material to be tested or measured in some manner.

Lower drive electrode assembly 21L and upper drive electrode assembly 21U are spaced apart from pickup electrode assembly 28 by spacers 27L, 27U. The spacers provide room for pickup electrode 29 to move between lower drive electrode 22L and upper drive electrode 22U. Upper drive electrode 22U is mounted on the bottom surface of assembly 21U in the same manner as lower drive electrode 22L is mounted on the top surface of assembly 21L. Assemblies 21L and 21U are shown in FIG. 1 as mirror images of each other, but they may also be identical. Drive electrode assembly 21L also includes substrate 26L, typically a glass fiber-epoxy composite material commonly used for printed circuit boards, tab 23L for electrical connection to drive electrode 22L, driven shield 24L, and tab 25L for connection to driven shield 24L. Not visible in FIG. 1 are the corresponding tabs and driven shield in upper drive electrode assembly 21U.

The driven shields were required to minimize non-linearity in the prior art transducer due to the large area of frame 31 electrically connected to pickup electrode 29. Having frame 31 mechanically connected to pickup electrode 29 simplified the construction of pickup electrode assembly 28, but also added a large area that would contribute to unwanted parasitic capacitance. Avoiding this parasitic capacitance was done by feeding a unity gain buffered replica of the pickup electrode signal to the driven shields. Because the pickup electrode signal is on frame 31 and the buffered signal is on the driven shields, spacers 27L, 27U must be electrically insulating.

The insulated spacers in the prior art transducer were fabricated by chemically etching the spacers from a sheet of aluminum, and then forming an insulating coating by anodizing the aluminum to form an insulating aluminum oxide coating. This produced spacers having desirable mechanical properties such as relatively low TCE (thermal coefficient of expansion), and high stiffness, but the anodization process was troublesome and sometimes did not produce a satisfactory insulation layer, resulting in reduced yields and even worse, some delayed and intermittent failures of transducers in the field.

The most significant drawbacks of the prior art transducer are due to the electrostatic actuation and position sensing function being shared by the single pickup electrode. Referring to FIG. 2A, note that oscillator 35 and electrostatic controller 36 both apply signals to drive electrodes 22L, 22U. The output of electrostatic controller 36 is a high voltage DC signal between 0 and 600V. Normally only one output of electrostatic controller 36 is active at a time. The high voltage signal is applied to which ever drive electrode it is desired that pickup electrode 29 be attracted towards. Oscillator 35 has two outputs, which are 25 to 50 KHz square waves, switching between ground and 15V. There is a 180 electrical degree phase difference between the two oscillator outputs. The outputs of the electrostatic controller and oscillator are incompatible with each other. If they were connected directly together, neither one would function properly, and the oscillator could be destroyed, as it is only rated for operation at 15V. Resistive buffer B1, and capacitive buffer B2 combine the low frequency high voltage signal from electrostatic controller 36 and oscillator 35, while isolating the controller and oscillator signals from each other. Buffer B1 consists of two resistors typically between 100,000 and 1,000,000 ohms each, and buffer B2 consists of two capacitors typically of 500 to 1000 pF. The resistors must be large enough so that the output capacitance of the electrostatic controller does not load the oscillator, and the capacitors must be large with respect to the capacitance C1 plus C2 of transducer 20B, which is typically about 10 pF. The buffers work well when only very low frequencies (less than 10 Hz) are required from controller 36, and the transducer is operating within its normal travel range.

Unfortunately, the buffers do not work well at higher frequencies, such as are required for such tasks as determining the loss modulus versus frequency of polymers, for which frequencies of at least 100 Hz are desired. At higher frequencies, phase shift and loss in amplitude of the electrostatic controller output signal occurs in the buffers, so that the actual electrostatic signal applied to the transducer drive electrode is different from the electrostatic controller output voltage, creating measurement error.

An even more serious problem is that the transducer cannot be guarantied to always operate within its normal range. If the sample is soft, or the setup is incorrect, so that there is more space than intended between the tip and the sample, the pickup electrode deflection can exceed the maximum stable range which is ⅓ of the nominal electrode spacing. Once the displacement exceeds ⅓ of the nominal spacing, the pickup electrode suddenly and uncontrollably snaps over and contacts the drive electrode. Since this snap over event typically occurs when the output of the electrostatic controller is rather high, at least several hundred volts, possibly up to 600 volts will be stored on one of the capacitors in buffer B2. This voltage is applied to the input of signal detector 37, which is a highly sensitive amplifier with a maximum rated input voltage of 15 to 20V. As the buffer capacitor suddenly discharges into signal detector 37, a large current surge is applied to the oscillator output, as it is pulled below ground. The snap over event frequently destroys either the oscillator or the signal detector or both. The problem was so severe that a software protection scheme was implemented to shut off the electrostatic controller if the deflection of pickup electrode 29 exceeded 5 µm. Although this does protect the transducer, it prevents operation over most of what would be the normal operating range of up to 30 µm displacement.

Another limitation of the prior art transducer is the moving mass of the pickup electrode assembly and tip. This is shown most clearly in FIG. 3. Although the description of the prior art transducer given in the 483 patent indicates that pickup electrode 29 is a single layer of metal foil, the output signal of that design was subject to excessive errors due to its lack of resistance to side forces on probe 33. another prior art patent by Bonin, U.S. Pat. No. 5,553,486 titled "Apparatus For Microindentation Hardness Testing And Surface Imaging Incorporating A Multi-Plate Capacitive Transducer System", issued Sep. 10, 1996, describes an application where the transducer is used in conjunction with an atomic force microscope to provide both microindentation hardness testing and imaging of the sample surface with the same probe tip, so that even at extremely high magnification, there is no loss of position between indenting and imaging. For this application, prior art transducer 20A shown in FIG. 1 was simply not suitable, due to side to side rocking, and prior art transducer 20C shown in FIG. 3 was developed. The overall width of transducer 20C was about 12.5 mm. The thickness of drive electrode substrates 26U, 26L were about 1.5 mm. Transducer 20C includes grounded shield electrodes 39U, 39L on outer surfaces of substrates 26U, 26L. Instead of single layer pickup electrode assembly 28, transducer 20C has a pickup electrode assembly including top skin 28U spaced apart from bottom skin 28L by core 38. Skins 28U, 28L are identical to pickup electrode assembly 28, except for the added hole for screw 41, which is used to mount probe tip 40. There is a trade off between resistance to side to side rocking and moving mass in the selection of the thickness of core 38. A thicker core increases the resistance to rocking, which is desirable, but also increases the moving mass, which is undesirable. The core is fabricated with many cutouts to reduce the mass, but it still added substantially to the total moving mass. A thickness of 0.635 mm was chosen as a reasonable compromise. With a 75 µm thickness for skins 28U, 28L, the total moving mass with screw 41 was about 220 mg, and probe tip 40 added another 17 mg. Although this mass may seem to be quite small, it is many orders of magnitude greater than the mass of the cantilever probes used in atomic force microscopes. A reduction in mass is desired because lower mass reduces the sensitivity to vibration, and allows more rapid movement of the probe, which is important for imaging in a reasonably short time.

A further problem with the prior art transducer is hysteresis and creep. This was noticeable at larger displacements and loads, and prevented the transducer from operating as an accurate load sensor at more than a few grams. The construction technique of the prior art transducer, where a plurality flat sheets of etched metal layers and insulating substrate layers are bonded together in an assembly, allows a wide range of load and displacement ranges to be created by selecting appropriate spring dimensions and spacer thickness. The problem with the technique is that polymeric materials, such as epoxies or other adhesives used to bond the layers together will begin to deflect and creep excessively at stresses far below those that cause obvious failure. The spring design of the prior art transducer magnified this problem since the most highly stressed region of the springs, where the base of the spring connects to the frame, is adhesively bonded to the spacers. The effect of this on the prior art transducer output is that after a large load is applied to the transducer and then removed, the transducer output signal does not immediately return to zero, but retains some small but undesired offset. Even worse is that the offset is not stable, but gradually disappears over some minutes or hours, so that sensitive measurements made at low loads after a high load measurement will be continuously effected by this changing offset signal.

A final problem with the prior art transducer is that the springs supporting the moving electrodes cannot be made as thin and flexible as desired, due to a propensity to buckle under forces along their length. These forces along the length of the springs are due to TCE mismatches between the various materials used in the construction of the transducer, as well as side loads in the X or Y direction.

BRIEF SUMMARY OF THE INVENTION

The transducer of the current invention has been fabricated with a moving mass of 46 mg including the 17 mg probe tip, which is 5 times lower than the prior art transducer. The mass reduction was achieved by using 25 µm thick pickup electrode skins that were partially etched to about 7 µm thick on the inner surface to reduce the thickness even further. The core thickness was 75 µm. The 125 µm total thickness of the moving electrode assembly, or rotor, is enough to provide a very rigid, flat assembly, but is not thick enough to provide optimal resistance to sideways rocking. Resistance to sideways rocking is provided by using two rotor plates, spaced apart by 1.5 to 2 mm, and connected to each other by a lightweight, rigid tubular stem. This provides significantly more resistance to sideways forces than the prior art transducer, while at the same time reducing the moving rotor mass as well. The moving electrode assembly of the current transducer is referred to as the rotor, since the moving electrode is not necessarily the pickup electrode.

Many new features were incorporated into the current transducer to achieve the low mass and provide other advantages. In the prior art transducer it was not possible to use rotor plate skins with a thickness as small as 25 µm, due to buckling of the springs (the thickness of the springs is the same as the thickness of the electrode skin, as they are etched from the same metal foil). Buckling of the springs occurs when the compressive load along the length of the spring exceeds a critical value which depends on the ratio of the length to thickness. When the critical value is exceeded, the spring suddenly bulges out sideways, and no longer provides the stable, well defined support required. The source of the buckling load is due to mismatches of TCE of the transducer materials, creating locked in stress from the epoxy curing process which bonds the layers of the transducer together. Even if there is no locked in stress from the transducer manufacturing operation, side loads can also cause buckling, as they will place half of the springs in compression. A feature to increase the resistance to buckling was successfully incorporated into the springs of the current transducer.

Etched alignment features in the metal layers of the current transducer greatly increase the alignment accuracy between the various layers. This is especially critical for the rotor plates. In the prior art transducer, the etched features in the core had a width of over 500 µm, partly required due to the errors of up to 100 µm present in aligning the skins to the core during the bonding of the rotor plates. In the current transducer, the etched alignment features reduced the assembly alignment error to less than 10 µm. Etched features in the core and inner side of the electrode skins of 125 µm presented no problems. It appears that 75 or even 50 µm features are feasible.

The inclusion of two separate rotor plates allowed the position sensing function and the electrostatic actuation function to be isolated from each other, eliminating the possibility of destruction of the oscillator and/or signal detector by the electrostatic actuation voltage. A further related advantage is that the electrostatic actuation voltage is now applied directly to the appropriate transducer electrode, eliminating the errors caused by the buffer elements of the prior art transducer. Since the electrostatic voltage applied to the transducer is the same as the output of the electrostatic controller, it can now be easily measured by utilizing the resistive voltage divider normally included in the controller.

The problem of hysteresis and creep present in the prior art transducer was solved by incorporating a stress distribution feature into the joint design at the base of the springs, so that the maximum stress in the bond is reduced by a factor of 10.

Another improvement over the prior art transducer is in using small press in electrical interconnection pins that mate with receptacles in the drive circuit board to connect the transducer to the drive circuit. This is both more convenient than soldering to the tabs of the prior art transducer, and also provides better performance as the electrical interconnection is now smaller and better shielded by the grounded layers inside the transducer, whereas the connections in the prior art transducer were larger and completely exposed on the outside of the transducer, rendering them vulnerable to corruption by external noise sources.

By choosing the appropriate thickness, width, and length dimensions for the support springs, the maximum load range may be varied from less than one gram to more than 1000 grams. The transducer for a one gram or less capacity may be 12.5 mm square. The transducer for a 1000 gram capacity may be 35 mm in diameter.

A transducer with multiple dimension operation may be produced by reducing the spacing between the two rotor plates, or using a single rotor plate, so that a sideways force on the probe tip will rock or tilt the rotor electrode, and incorporating multiple drive and pickup electrodes. The tilting of the rotor electrode results in different output signals from the different pickup electrodes, allowing determination of force and/or displacement in multiple directions.

The accompanying figures and detailed description, as well as the claims, provides details regarding specific embodiments of the current transducer, optimized for various conditions including load capacity from less than one gram to over 1000 grams.

DETAILED DESCRIPTION OF THE INVENTION

Figure 1:
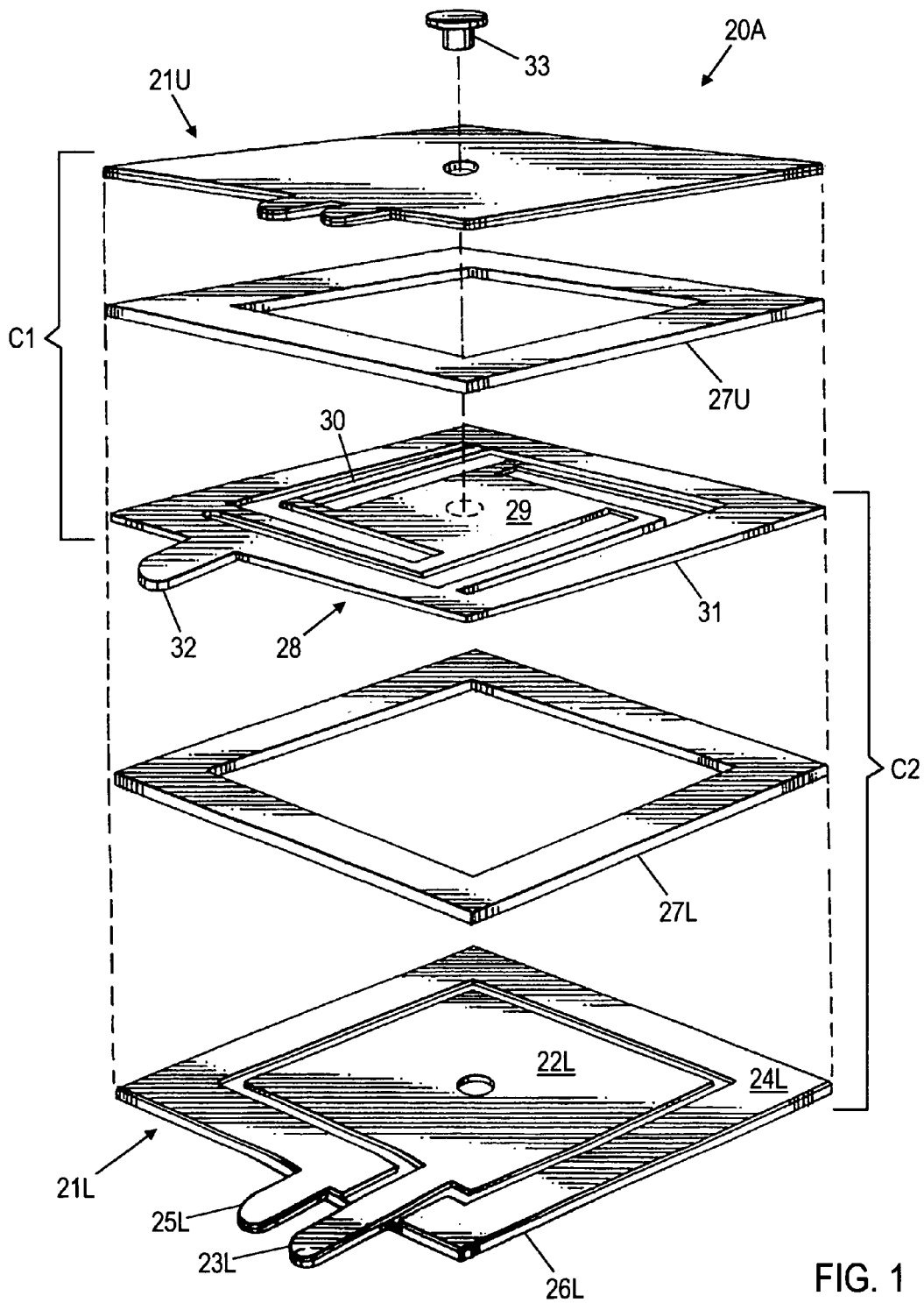
FIG. 1 shows a simplified exploded view of a prior art transducer.
Figure 2A:
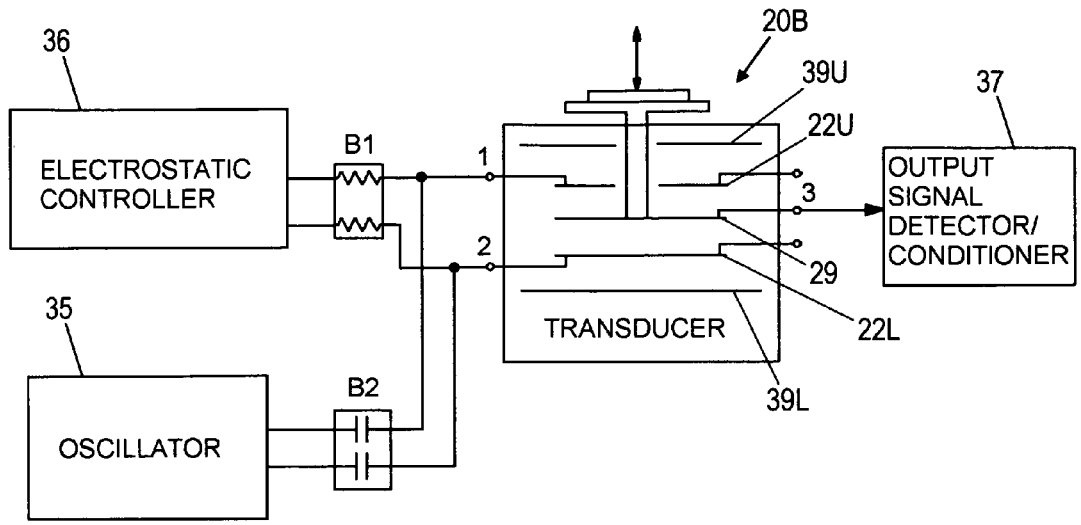
FIG. 2A is a schematic/block diagram of the prior art transducer with the associated electronic circuitry.
Figure 2B:
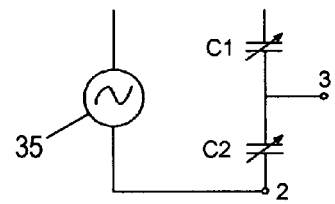
FIG. 2B is an electrical schematic representation of the transducer.

In reading the following description and claims, it should be understood that any reference to relative terms such as upper and lower, top and bottom, left and right, are used with respect to the orientation of the transducer in the referenced drawings, and that simply re-orienting the transducer does not effect the operating principles of the transducer or its relation to the scope of the appended claims. In the same manner, when a part, such as the rotor, is described as being movable with respect to another part, it should be understood that the rotor could be fixed and the other part allowed to move, with the electrical response of the transducer being the same in either case.

As an aid to comprehension of the numerous elements presented in the drawings and following description, similar items are identified by the same numeric reference with an alphabetic suffix added to indicate the relative position of the object. The alphabetic suffixes used in the drawings are B for bottom, C for center, T for top, L for lower, U for upper. In a slightly different usage, E is used to represent an etched hole that cooperates with a drilled hole of the same numeric reference. Due to the large number of elements presented in some of the drawings, to avoid excessive clutter, holes that line up vertically with each other and are present in multiple layers of the structure are referenced on only one layer, when it is clear from the drawing that the holes cooperate for some common purpose. As a final simplification in the following detailed description, the bottom rotor will be associated with the position sensing mechanism, and the top rotor with electrostatic actuation, although the position of these functions could be reversed with no consequence in the operation or performance of the transducer.

The preferred embodiments of the transducer of the current invention include two rotor plates spaced apart from each other by a rigid stern. The rotor plates are connected to a frame or other support means by springs which are preferably an integral part of the rotor plate skin layers. This configuration allows well defined motion along a single axis, which will be referred to as the Z-axis. The configuration is highly resistant to unwanted motion in the other directions, or axes, referred to as the X and Y axes. One of the rotors, operating in cooperation with other electrodes that are fixed with respect to the rotor, is used to measure the position of the rotor. The other rotor may be included as a mechanical element only, to achieve the desired resistance to side loading, or it may be used as an actuator by applying a voltage potential between it and at least one facing electrode, in what is termed electrostatic actuation. Electrostatic actuation is generally limited to maximum forces in the order of 1 to perhaps 10 grams, but it is proportional to the electrode area, so there is no absolute limit, only practical limits set by the desired maximum size of the transducer. If electrostatic actuation is not desired but maximum temperature stability is desired, both rotors may be used as position sensors to average out any thermal distortions in the transducer. Note that the term "position sensor" is used here as that is the actual quantity measured by the transducer and its associated circuitry. When used as a force sensor, the output is calibrated to represent the change in position, or displacement, times the spring constant of the support springs. Acceleration may also be measured, as the acceleration to be measured acts on the moving mass of the rotor and stem, generating a force equal to the product of the mass and acceleration.

Figure 4:
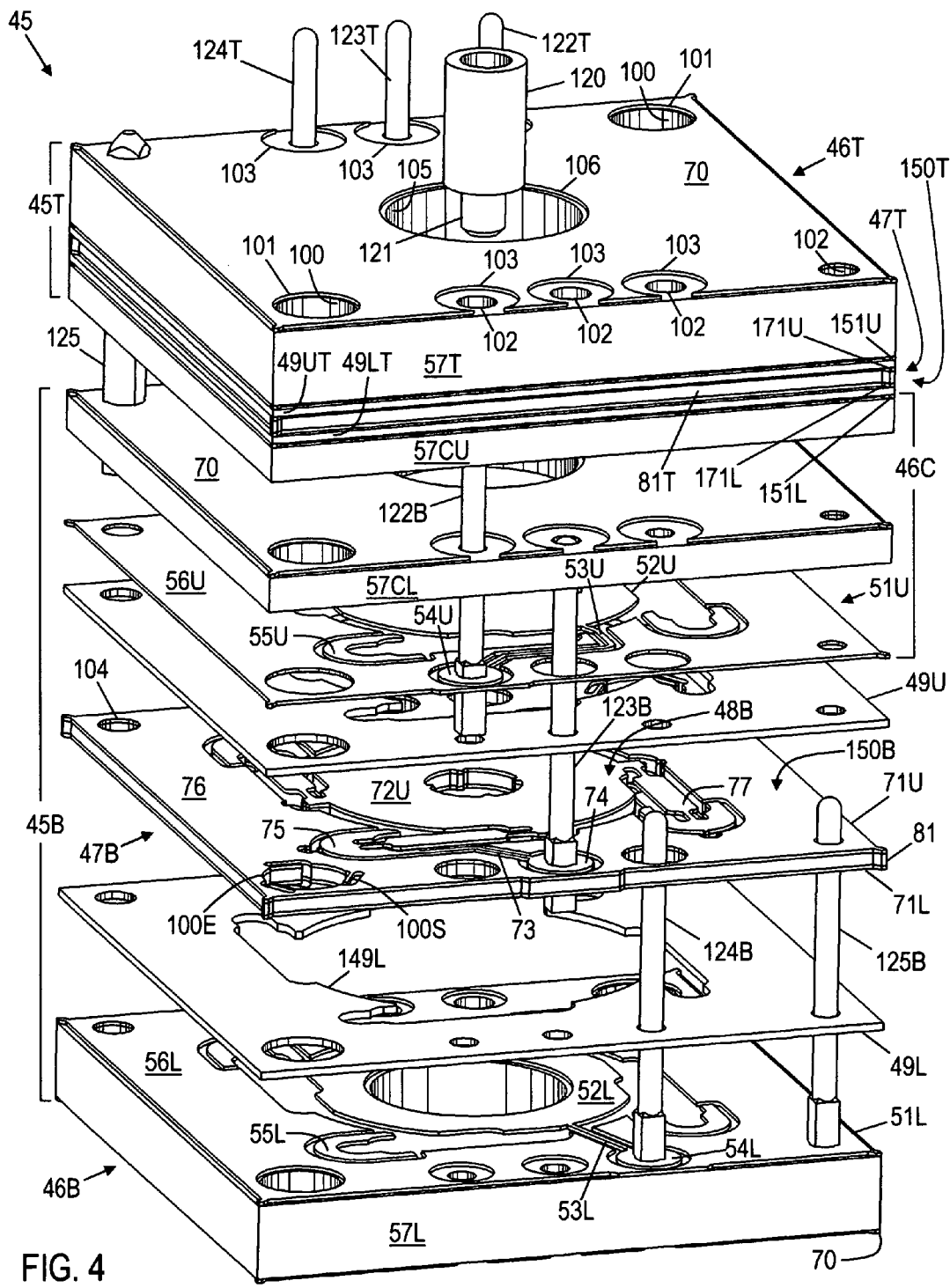
FIG. 4 is an exploded view of a first preferred embodiment of the current transducer.

Referring to FIG. 4 as needed, the first preferred embodiment of the transducer is presented. This embodiment is structurally the most complicated, but is also the most versatile electrically. The transducer is constructed of a number of layers of metals and insulating substrates and spacers laminated together. There are a number of methods of fabricating the metal layers, but the preferred method is photochemical etching, which is a well-known process and will not be described unnecessarily here. For ease of fabrication, the insulating layers may be standard glass-fiber epoxy composite printed circuit board substrate material know in the industry as G-10. This material may be easily machined to the required form by standard printed circuit board drilling and routing equipment.

Figure 3:
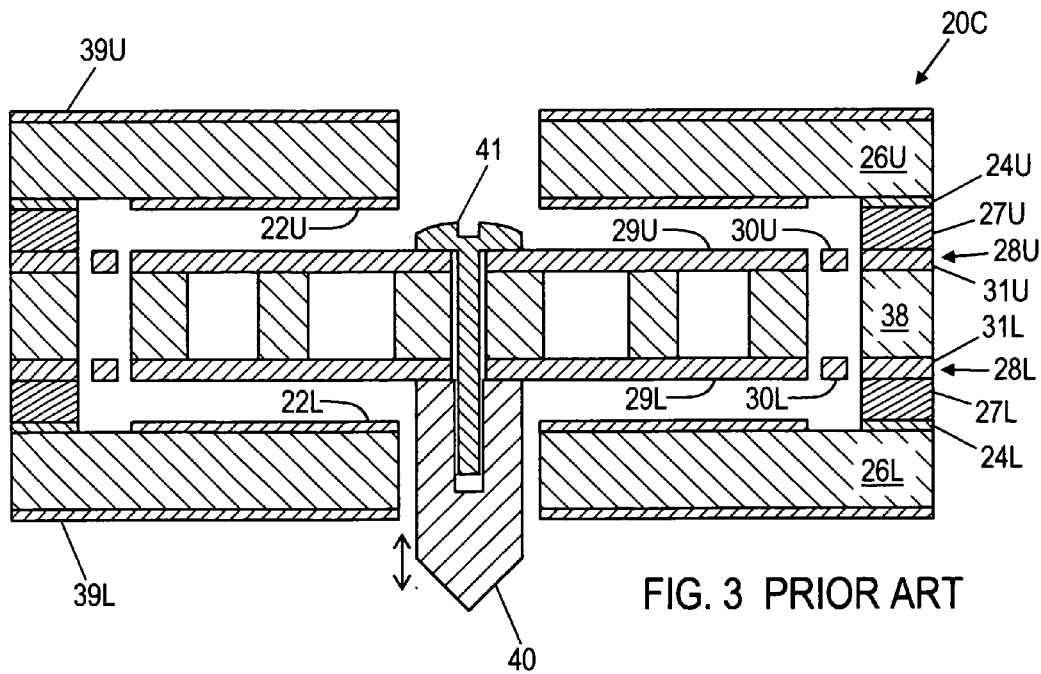
FIG. 3 is a cross section of the prior art transducer, with the Z-axis scale distorted to show more clearly the thin components of the transducer.

The elements of the transducer are grouped into a number of assemblies and sub-assemblies to simplify the drawing and aid comprehension. The largest assemblies are bottom section 45B and top section 45T. Each section has some similarity to transducer 20C shown in FIG. 3. Top section 45T is identical to bottom section 45B except for the relative thickness of the substrates, and holes 102 and 104, which are drilled after the final assembly operation, and so are not rotated with the top section. Since the interior details of both sections are the same, there is no loss of information due to section 45T being shown un-exploded. The entire transducer, transducer assembly 45, includes three substrate assemblies. Bottom substrate assembly 46B includes lower substrate 57L, shield 70 attached to the bottom surface of substrate 57L, and lower drive electrode layer 51L, attached to the top surface of substrate 57L. Shield 70 is employed at several locations within the transducer. The clearest view is at the very top surface of transducer 45. Drive electrode layer 51L is labeled lower due to its position relative to rotor plate layer 47B. Drive electrode layer 51L includes drive electrode 52L, trace 53L, pad 54L, isolated support 55L (4 places), and frame 56L. Center substrate assembly 46C includes, from bottom to top, upper drive electrode layer 51U (upper, since it is above rotor plate layer 47B), center lower substrate 57CL, shield 70, center upper substrate 57CU, and lower top drive electrode layer 151L, attached to the top surface of substrate 57CU. Electrode layer 51U is attached to the bottom of substrate 57CL, and shield 70 is attached to the top of substrate 57CL Electrode layer 51U includes drive electrode 52U, trace 53U, pad 54U, support 55U, and frame 56U. Except for the routing of trace 53U and location of pad 54U, electrode layer 51U is identical to electrode layer 51L. Top substrate assembly 46T includes substrate 57T, shield 70 attached to the top surface of substrate 57T, and upper top drive electrode layer 151U, attached to the bottom surface of substrate 57T. The substrate material is preferably obtained with thin copper foil about 35 µm thick attached to both sides, so that the shields and electrode layers are formed in place on the substrates by etching.

Figure 5:
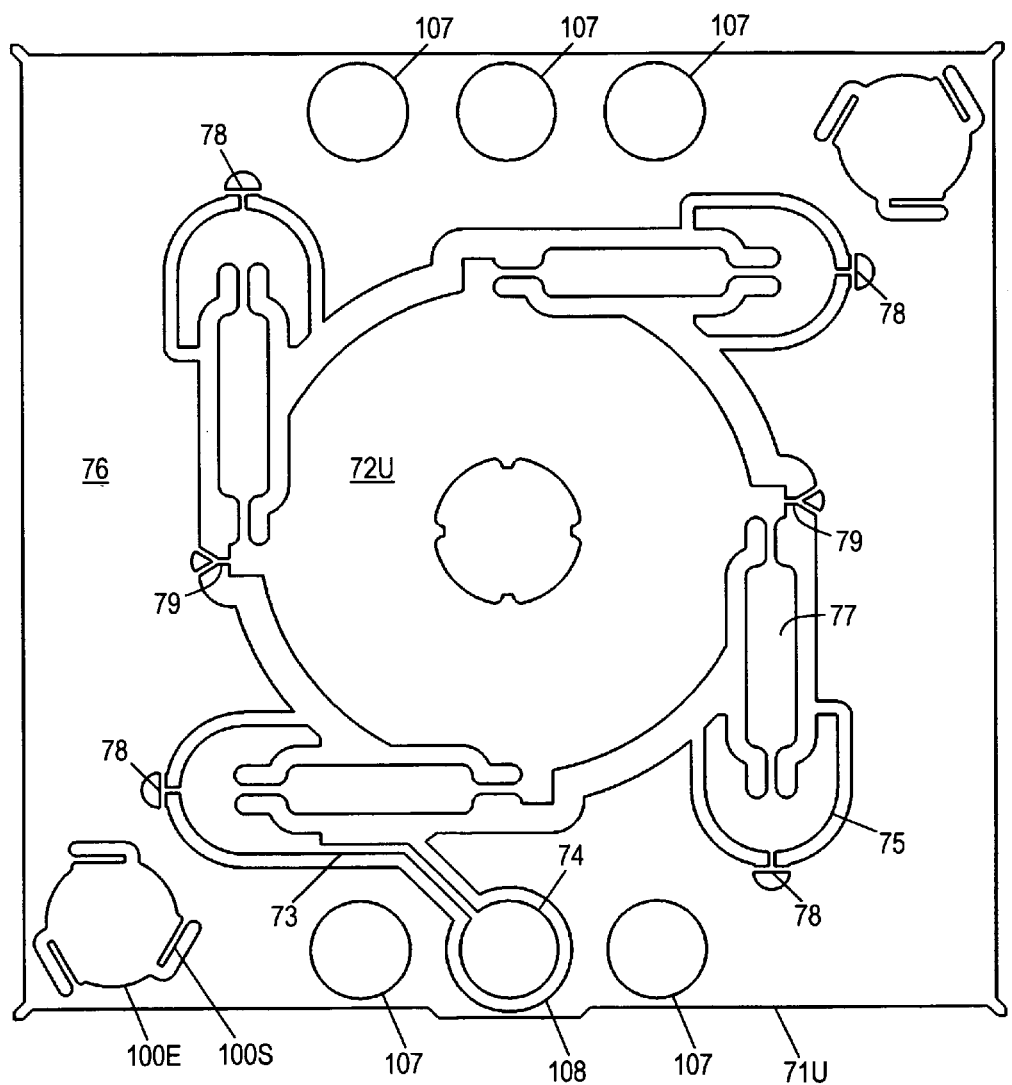
FIG. 5 is a plan view of the rotor skin layer of the first embodiment.

Rotor plate layer 47B includes upper rotor skin layer 71U, lower rotor skin layer 71L, and rotor core layer 81. The skin layers are bonded to the core layer forming rotor plate layer 47B prior to assembling the entire transducer. The two skin layers are identical on the outer surfaces. The inner surfaces (not visible in FIG. 4) contain mass reduction features which will be described later. Rotor plate skin layer 71U includes rotor plate skin 72U, trace 73, pad 74, spring anchors 75, frame 76, and springs 77. Note that springs 77 and spring anchors 75 occur in four places within skin layer 71U. A plan view of skin layer 71U is shown in FIG. 5. Referenced components 73 to 77 are identical on both the upper and lower skin layers. FIG. 5 also shows spring anchor tabs 78 and rotor anchor tabs 79. Tabs 78 hold spring anchors 75 to frame 76. Tabs 79 hold rotor plate skin 72U to frame 79. Springs 77 are connected on one end to spring anchors 75, and to rotor plate skin 72U on the other end. Tabs 78, 79 are removed in a subsequent operation described below. Skin layer 71U as shown in FIG. 5 does not include holes 102, 104 which are included in FIG. 4, because FIG. 5 shows skin layer 71U as it is preferably fabricated by etching, prior to machining operations described below which remove tabs 78, 79, and drill holes 102, 104. Note that once the tabs are removed, rotor plate skin 72U is electrically isolated from frame 76. Electrical contact to rotor plate skin 72U is made by use of pad 74, which is connected to rotor plate skin 72U via trace 73, anchor 75 and spring 77. Springs 77 also provide mechanical support for rotor plate skin 72U. The electrical connection from pad 74 to the drive circuitry is by contact pin 123B, discussed in more detail below. Skin layer 71U includes holes 107 to provide clearance for electrical contact pins 122B, 124B, 122T, 123T, and 124T. Hole 108 is slightly larger than holes 107 to provide clearance for pad 74, as well as contact pin 123B. Skin layer 71U also includes etched alignment holes 100E, which preferably include at least three alignment springs 100S, equally spaced in a symmetrical pattern about the center of hole 100E.

Figure 6:
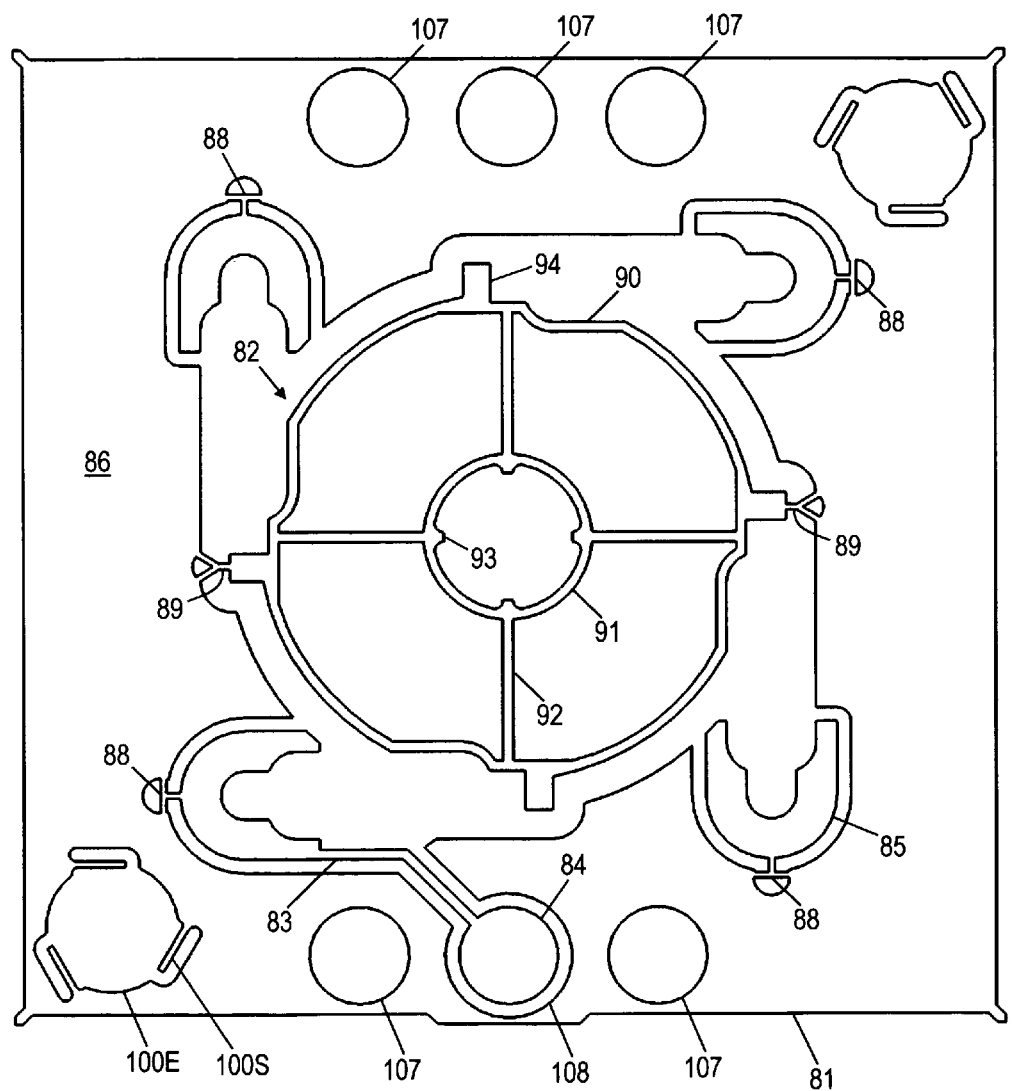
FIG. 6 is a plan view of the rotor core layer of the first embodiment.

FIG. 6 is a plan view of rotor core layer 81. Note that the shape of rotor core layer 81 is nearly identical to that of skin layer 71U, except for the removal of the springs, and for large open regions in rotor core 82, for mass reduction. Trace 83, pad 84, supports 85, frame 86, and tabs 88, 89 are identical in shape to the corresponding items with numerical identifiers decremented by 10 in skin layer 71U. To reduce the rotor mass, rotor core 82 is fabricated with OD ring 90, ID ring 91, and web struts 92, so that most of the region enclosed by rotor core 82 is empty space. Other features that may be included are centering bumps 93 to center stem 120, while providing a well defined pocket for adhesive, and supports 94 to provide a rigid attachment for springs 77. Same numbered hole elements 100E, 107 and 108 are also identical to those in skin layer 71U.

Figure 7:
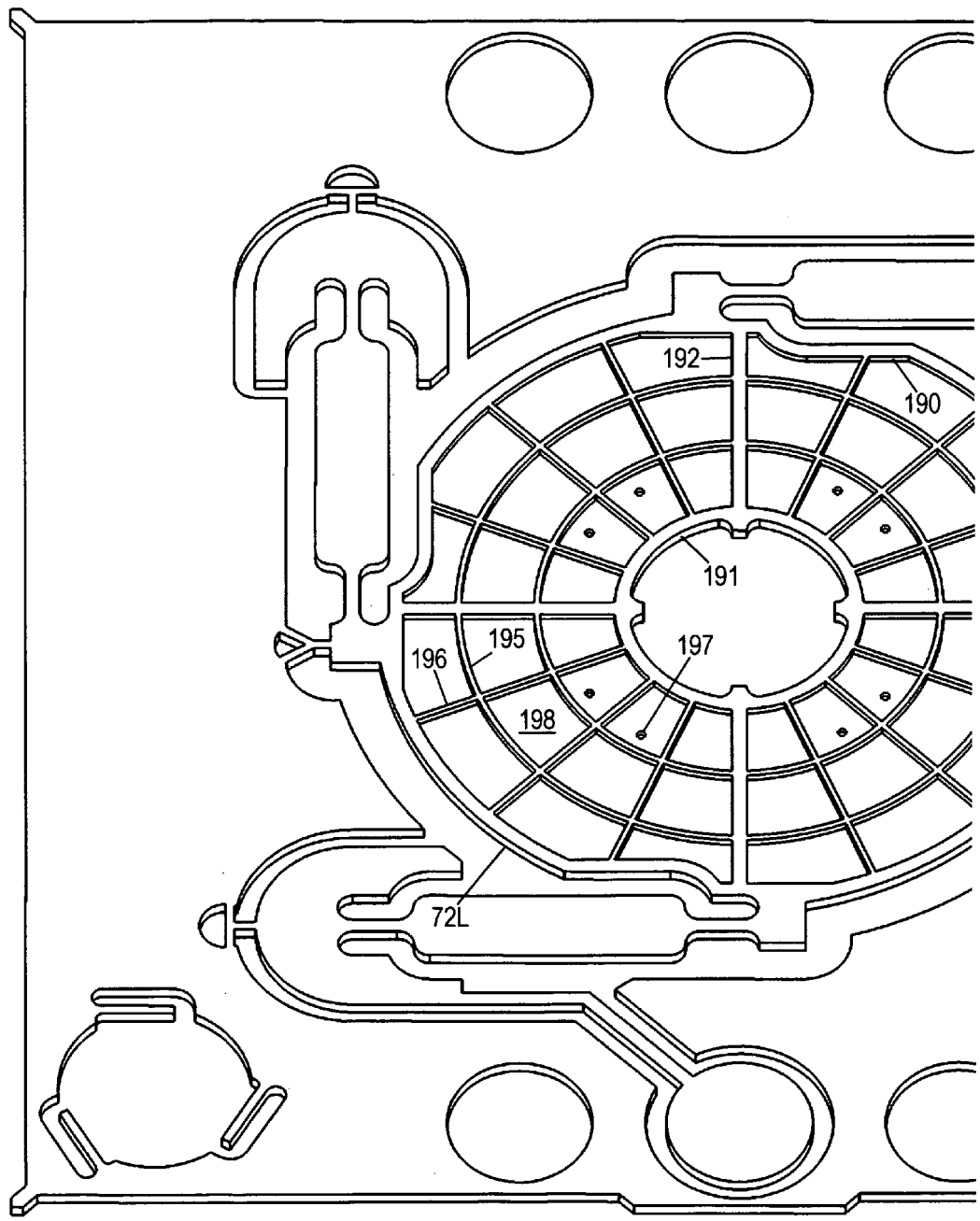
FIG. 7 is a perspective view of the inside surface of a portion of the rotor skin layer, enlarged to better show certain details.

A perspective view of lower skin layer 71L is shown in FIG. 7. The view is enlarged approximately 2 times with respect to the view of upper skin layer 71U in FIG. 5, to show the detail of the mass reduction features. This view shows the upper surface of lower skin layer 71L. This surface is bonded to the lower surface of rotor core layer 81. The mass reduction features are generated by etching layer 71L using different masks for the upper and lower surfaces, so that most of the upper surface of rotor plate skin 72L is exposed to the etch solution during the etching process, and only OD ring 190, ID ring 191, web struts 192, circumferential ribs 195, and radial ribs 196 are protected from the etch solution. The thickness of rotor plate skin 72L in pockets 198 may be controlled by the length of the etch time after the regions being etched from both sides have cleared. Holes 197 are etched all the way through rotor plate skin 72L to equalize the pressure on the inside of rotor plate skin 72L with the ambient pressure, so that the transducer will not be responsive to changes in ambient pressure which would distort the surface of rotor plate skin 72L if it were closed. Ribs 195, 196 stiffen rotor plate skins 72L, 72U, allowing a deeper partial etch and lower overall mass of the rotor plate skins. Other patterns of ribs than that shown may also be used.

The preferred procedure for assembling individual etched layers 71L, 81, and 71U into rotor plate layer 47B is to coat layer 81 on both sides with an adhesive, stack layers 71L, 81, and 71U in order on a flat surface, using standard round tooling pins (not shown) inserted through holes 100E to align the three layers, and cure the adhesive while maintaining sufficient pressure on the top of the stack to keep all the layers flat and in intimate contact until the adhesive has cured. In designing hole 100E and alignments springs 100S, the alignment springs should be positioned to operate with a standard size tooling pin. For a small transducer width length and width of 12.5 mm, a tooling pin of 1.6 mm or 1/16 inch diameter is preferred. Alignment springs 100S should be designed to interfere slightly with the tooling pins, so that the springs are deflected outwards from the center of hole 100E when the tooling pins are inserted, thereby creating a force in the springs acting on the tooling pins that tends to center holes 100E about the tooling pins. This method is much more accurate than using simple round holes. If the round holes were drilled, there would be an alignment error due to drilling mis-registration, and if the holes were etched without the spring features, there would necessarily need to be some clearance between the hole and the pin, since the etching dimensions cannot be controlled exactly, so there would be some slop between the holes and the pins, although etched round holes without alignment springs are generally more accurate than drilled holes. With the alignment springs pressed firmly against the pins, there is no slop in the alignment, and the etching tolerance only increases or decreases the force on the springs slightly, it does not change the location of the center of the holes. The three inner elements of the etched layers, lower rotor plate skin 72L, rotor core 82, and upper rotor plate skin 72U constitute rotor plate 48B. Frames 76 of skin layers 71U, 71L, and frame 86 of rotor core layer 81 constitute bottom frame 150B of bottom rotor plate layer 47B. Top rotor plate layer 47T, including the three layers upper skin layer 171U, lower skin layer 171L, and rotor core layer 81T, is assembled in the same manner as bottom rotor plate layer 47B. Top layer 47T is identical to bottom layer 47B, other than orientation, and the location of holes 102, 104. Top rotor plate layer 47T includes a top frame 150T, which is equivalent to bottom frame 150B.

After rotor plate layer 47B is created as described above, it is bonded to bottom substrate assembly 46B using spacer 49L. Referring to FIG. 4, notice that spacer 49L has central cutout 149L so that spacer 49L covers frame 56L and spring anchors 55L of substrate assembly 46B, but does not interfere with motion of rotor plate 48B or springs 77. The assembly process is similar to that used to fabricate rotor plate layer 47B. Spacer 49L is coated on both sides with adhesive, tooling pins are inserted into alignment holes 100 of substrate assembly 46B, spacer 49L is placed on the top surface of substrate 46B with the tooling pins passing through alignment holes 100 in spacer 49L, finally rotor plate layer 47B is placed on top of spacer 49L, with the tooling pins passing through etched alignment holes 100E of layer 47B. Pressure is applied to the top surface of layer 47B until the adhesive on spacer 49L is cured. In this embodiment, spacer 49L must be an insulator. The thickness of spacer 49L determines the available travel of rotor plate 48B in the downward direction. The preferred thickness range is between 25 and 125 μm. The material may be the same G-10 material used for substrate 57L. After this assembly procedure, spring anchors 75 on the lower surface of rotor plate layer 47B are bonded to spacer 149L, so tabs 78, 79, 88, 89 are no longer needed and are removed by a small diameter end mil of about 0.38 mm diameter. After removing the tabs, rotor plate 48B is mechanically free to move up and down, being supported only by flexible springs 77. the rotor is also electrically isolated from frame 150B.

Top rotor plate layer 47T is bonded to center substrate assembly 46C by lower top spacer 49LT in the same manner as just described, with spacer 49LT (identical to 49L) being coated with adhesive on both sides. The tabs are removed in the same manner as well, after the adhesive is cured.

The final assembly of the entire transducer is performed by coating spacers 49U and 49UT (which are identical to spacer 49L) with adhesive, and inserting tooling pins into holes 100 of the assembly formed by substrate 46B, spacer 49L and rotor plate layer 47B. Using holes 100, spacer 49U is then slipped over the tooling pins and pressed down onto rotor plate layer 47B. Using holes 100, the assembly consisting of substrate assembly 46C, spacer 49LT, and rotor plate layer 47T is slipped over the tooling pins and pressed down onto spacer 49U. Using holes 100, spacer 49UT is then slipped over the tooling pins and pressed down onto rotor plate layer 47T. Finally, substrate assembly 46T is slipped over the tooling pins using hole 100, and pressed down on spacer 49UT. Pressure is applied to the top of substrate assembly 46T until the adhesive is cured. The tooling pins are then pressed out of the transducer. Removal of the tooling pins is easier if they are coated with a thin film of oil or mold release prior to use. All four spacers are typically the same in thickness, but it is sometimes desirable for the thickness of the upper two spacers to be different from the lower two spacers, in case a longer travel is desired in one direction, or to compensate for the deflection of the springs supporting the rotor caused by gravity.

Holes 102, used to install the electrical interconnection pins, are then drilled all the way through the transducer, as is hole 104, used to connect all of the frame metal together. Hole 104 is preferably 0.031 inch in diameter, and ground pin 125 is a 0.025 inch square pin, which is pressed into hole 104. Since a 0.025 square has a diagonal length of 0.035 inch, the corners of ground pin 125 distort hole 104 as the pin is pressed in, and the corners of the pin are pressed tightly against the metal frame layers in the transducer (56L, 150B, 56U, 156L, 150T, 156U, as well as shield layers 70).

Smaller electrical interconnect pins, available from Mill-Max corporation, have a 0.018 inch diameter round section that is about 0.2 inches long for the top pins and about 0.3 inches long for the bottom pins. Both types of pins have a 0.019 inch square end that is 0.060 inch long. The square end is designed to make contact by a press fit into a plated through printed circuit board hole of 0.022 inch diameter. Testing showed that the holes did not need to be plated through, and reliable electrical contact could be made to the metal layers of the transducer by simply pressing the pins into drilled holes 102. Receptacles (not shown) to mate with the pins are also available from Mill-Max, and are used in the drive circuitry (not shown).

Electrical interconnect pin 125B connects to frame 56L of lower drive electrode layer 51L, and pin 125 connects that frame to all of the other frames and shields. Pin 125B in then connected to ground by the drive circuitry (not shown). Pin 124B connects to pad 54L of lower drive electrode layer 51L, which connects to drive electrode 52L via trace 53L. Pin 123B connects to pad 74 of rotor plate layer 47B, which is connected to rotor plate 48B via trace 73, spring anchor 75 and spring 77. Pin 122B connects to pad 54U of upper drive electrode layer 51U. Pad 54U is connected to drive electrode 52U via trace 53U. Pins 122T, 123T, and 124T are connected to the equivalent pads in top transducer section 45T, which has rotor plate layer 47T, plus upper and lower drive electrode layers, all three identical to the equivalent elements in section 45B, but rotated 180 degrees. Stem 120 containing stud 121 is then glued to the two rotor plates. Stem 120 must be an insulator. It may be a high strength plastic, or a ceramic material. The length of stem 120 should be slightly longer than the distance between the two rotor plates. An outside diameter of about 1.5 mm is preferable. Stud 121 may be a 000-120 brass threaded rod cut to length. Stud 121 is glued into stem 120 to secure it.

Figure 8:
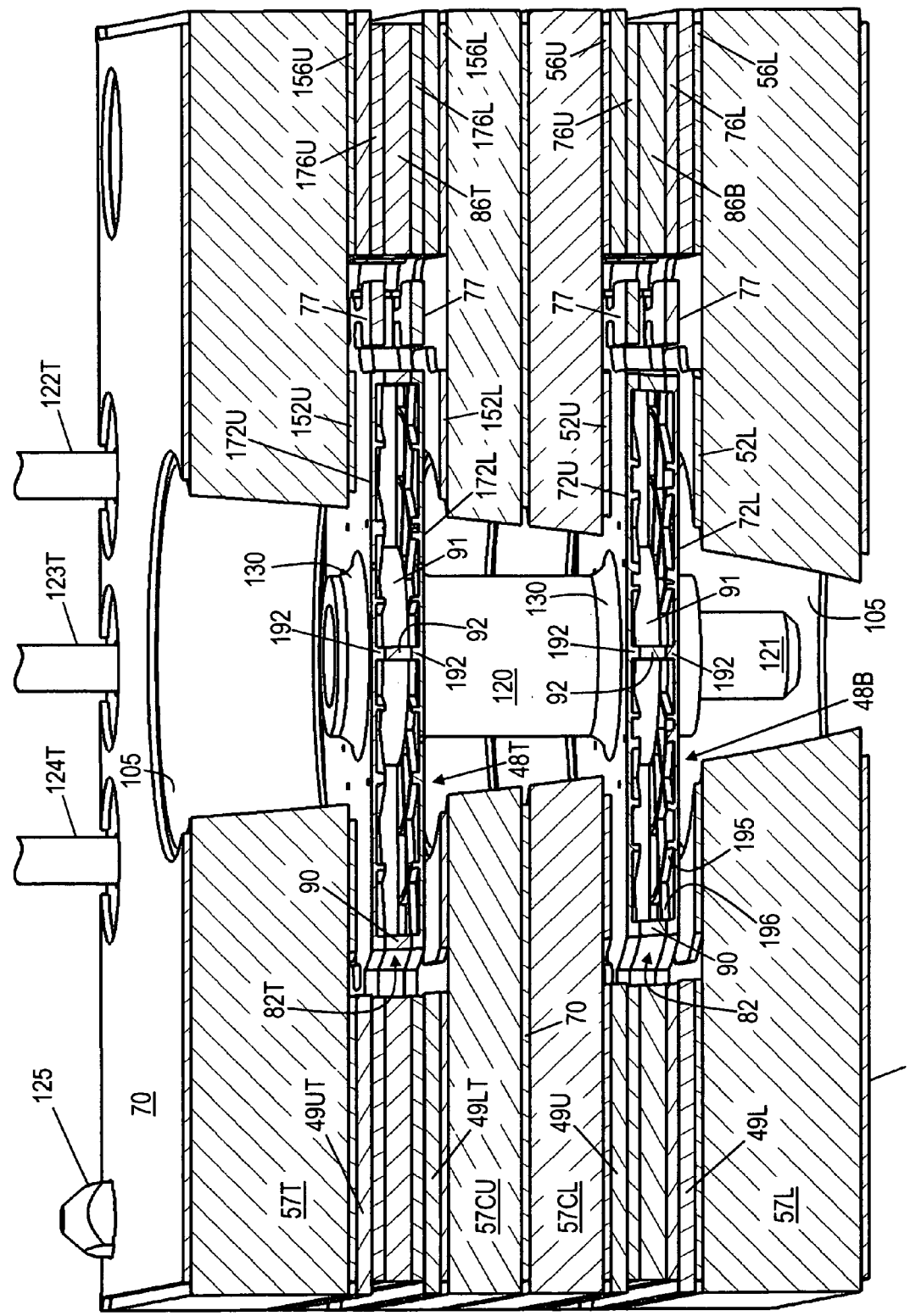
FIG. 8 is a sectional view of the transducer of the first embodiment.

FIG. 8 shows a sectional view of the transducer, in which both bottom rotor plate 48B and top rotor plate 48T are partly visible. A portion of the inside of the rotor plates including ribs 195, 196 is visible. Also visible in this view is the position of stem 120 with respect to the rotors, and glue 130 used to secure the stem to the rotors. Other elements not visible or poorly visible in FIG. 4 that are more clearly visible here are spacers 49UT, 49LT, lower top drive electrode 152L, upper top drive electrode 152U, lower top drive electrode frame 156L, upper top drive electrode frame 156U, lower top rotor plate skin 172L, upper top rotor plate skin 172U, lower top rotor skin frame 176L, upper top rotor skin frame 176U, top rotor core 82T including rotor core OD ring 90, rotor core ID ring 91, webs 92, top rotor core frame 86T, and web struts 192 of the rotor plate skins. The alignment of web struts 192 of the electrode skins to rotor core webs 92 is visible in the sectioned part of the drawing.

Figure 9:
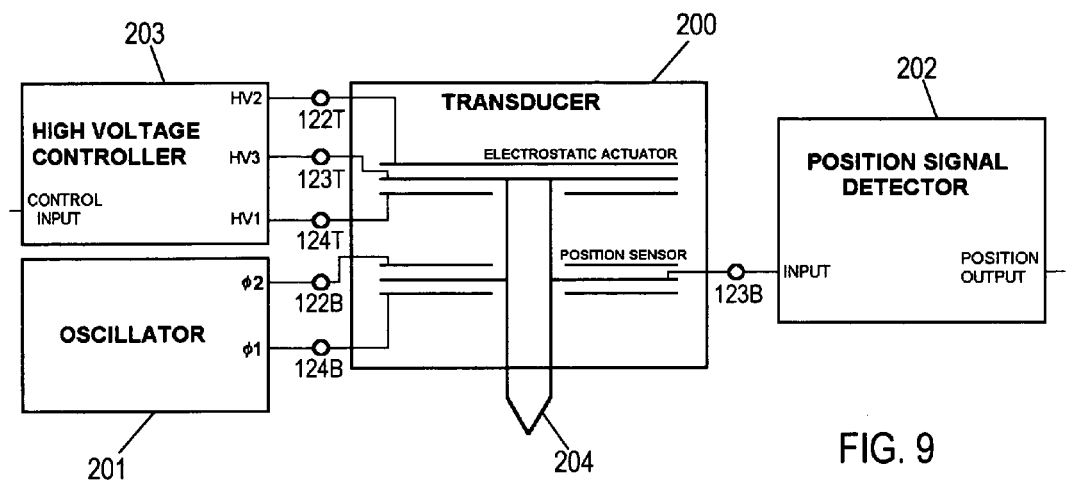
FIG. 9 is a block diagram of the circuitry used with the transducer of the first embodiment.

FIG. 9 shows a simplified schematic/block diagram of the current transducer and drive circuitry required to operate it. As previously stated, a detailed description of the circuitry is presented in U.S. Pat. No. 6,960,945 titled High-Performance Drive Circuitry For Capacitive Transducers. The alphanumeric terminal identifiers for transducer 200 in FIG. 9 correspond to the same alphanumeric electrical interconnection pins of transducer 45 in FIG. 4. Referring to FIGS. 4, 8, and 9 as required, the transducer position or displacement is determined by processing the output signal from bottom rotor plate 48B, which acts as a pickup electrode, using position signal detector circuitry 202. Drive electrodes 52L and 52U connected to oscillator 201 by pins 122B, 124B induce a voltage on rotor plate 48B, which varies in amplitude and phase based on the magnitude and direction of the displacement of rotor plate 48B from the center between electrodes 52L and 52U. This allows the transducer to be used as a position or displacement sensor, or as a load (including weight) sensor. The transducer may be used to generate a force, which may be applied to an external sample or device, by means of voltages generated by high voltage controller 203. This allows the transducer to perform precision measurements on a sample, such as nanoindentation measurements, for example. In one mode of electrostatic actuation, drive electrodes 152L, 152U, connected to high voltage controller signals HV1 and HV2 by pins 122T and 124T, each have a DC bias voltage of opposite polarity from the other. High voltage controller signal HV3 connected to rotor plate 48T by pin 123T controls the force generated by the transducer. This mode provides an electrostatic force which is linear with the voltage applied to rotor plate 48T, so long as rotor plate 48T is centered between drive electrodes 152L, 152U. Even if rotor plate 48T is not centered, the force is much more linear than the more typical mode, where rotor plate 48T is grounded, and only one of outputs HV1 or HV2 are active at any particular time. In the more common mode, HV1 is activated to generate a downward force, and HV2 is activated to generate an upward force. In this mode, the force is proportional to the square of the applied voltage. This mode is more common because current computer data acquisition systems commonly used with the transducer can easily take the force non-linearity into account, by calculating and generating the voltage required to produce the required force. Besides the extra cost of an additional high voltage output, the first mode has the disadvantage of being more limited in maximum output force, due to an instability that limits the magnitude of the bias voltages. If that limit is exceeded, the rotor position becomes unstable and snaps over towards one drive electrode or the other in an uncontrolled manner. Although this does not destroy the circuitry as in the prior art, useful operation at or above the instability is difficult if not impossible.

Some final details not mentioned before are that stem clearance holes 105 in substrates 57T, 57CU, 57CL, and 57L must be large enough to allow the glue to be applied to stem 120 and rotor plates 48B, 48T without gluing the rotor plates to the drive electrodes. A diameter of 3.8 mm is suitable. Holes 103 in shield 70 on the top surface of the transducer are larger than holes 107 in the skin layers, core layers, and drive electrode layers. The larger size is needed to prevent the receptacles in the drive circuit (not shown) from contacting shield 70. Holes 101 and 106 are preferably etched larger than drilled holes 100 and 105, so that the drill does not contact the metal, which would create a burr which would interfere with the assembly operations by preventing the layers from contacting each other properly. When the substrate material is G-10 printed circuit board glass-fiber epoxy composite, which has a TCE of about 12 ppm/° C. in the X-direction and about 15 ppm/° C. in the Y-direction, a suitable metal material for rotor plate skin layers 71L, 71U is a commercial Be—Cu alloy such as Brush Wellman Alloy 25, which is a very high strength material with a TCE of about 17 ppm/° C. For a transducer with a load capacity of about one gram, the thickness of layers 71L, 71U may be about 25 μm. The thickness of core layer 81 may be about 75 μm. The core may be of the same Be—Cu alloy, or it may be a lower cost brass alloy, since it is not highly stressed. Shield 70 and drive electrode layers 51L, 51U are not stressed, and so they may be ordinary copper, as is readily available already laminated to the substrate material. The thickness of the copper for the shield and drive electrode layers is not critical, and may be about 35 μm, which is a commonly available thickness. Be—Cu and G-10 are relatively inexpensive materials with reasonable performance, but if the best possible performance is desired, other materials are better suited.

Two properties of the transducer may be improved by substituting other materials for the G-10 and Be—Cu. The first is temperature sensitivity. Temperature sensitivity is an undesired change in the output of the transducer due to temperature changes. The cause is due to the thermal expansion of the transducer materials with temperature. A mis-match between the various layers in the transducer causes a bending force in the internal elements of the transducer which can greatly magnify the problem. The differing expansion coefficients in the X and Y directions for the G-10 material also add to the problem, as there is no metal that is a match in both directions. Another problem with the G-10 is that the expansion coefficient in the Z-direction is much greater than in the X-Y plane, typically about 50 ppm/° C. This means that for good thermal expansion matching, stem 120 should be constructed of the same stack of metal and G-10 layers as in the frame of the transducer. Because of the small size of stem 120 for a one gram capacity transducer (about 1.5 mm diameter), this is rather difficult and expensive. The most practical material for stem 120 is a glass-filled high strength plastic, such as Ryton, available from Chevron Phillips Chemical Company, or a machinable ceramic such as Macor, from Corning. In either case, there will be a substantial mis-match in the TCE in the Z-axis between the stem and the frame of the transducer.

The second property that may be improved by material selection is the moving mass. The moving mass of the transducer includes the rotor mass, which is the sum of the masses of rotor plates 48B, 48T, stem 120, stud 121, glue 130, and half of the mass of springs 77, plus the mass of any probe tip (such as tip 40 shown in FIG. 3) attached to stud 121. The contribution from the springs is half of their mass because the end of the springs attached to the frame does not move. Reasons for reducing the mass were presented in the background of the invention section. The partial etch of the rotor plate skins and improved rotor core described previously provide a significant reduction in mass over the prior art transducer, but the Be—Cu alloy is rather dense, at 8.4 g/cc.

Titanium alloys with strength equal to or exceeding the Be—Cu alloys are available, and the density of the titanium alloys are about 4.8 g/cc, which is 43% less than the Be—Cu alloy. Constructing rotor plate layers 47B, 47T of titanium alloy rather than Be—Cu alloy and brass reduces the mass of those components by 43%, thereby reducing the sensitivity of the transducer to external vibration and allowing faster operation when the transducer is used in a surface profilometry or scanned probe microscope application, where the transducer includes a probe tip attached to stud 121, and the probe tip is scanned in the X and/or Y directions across part of a surface of a sample, with the probe in light contact with the sample surface. The output of the transducer is used to obtain topographical or other information about the sample. The output may also control certain functions of a profilometer or scanned probe microscope, such as adjusting the Z-height of the sample with respect to the probe tip.

The TCE of readily availably titanium alloys is in the range of 7.0 to 8.6 ppm/° C., which is half or less that of the Be—Cu alloy. While the lower coefficient is potentially beneficial, the TCE of the substrates must be matched to the titanium to obtain the benefit. With the G-10 and Be—Cu materials, the average CTE mismatch is 16.7−(12+15)/2=3.2 ppm/° C. If titanium alloy were substituted for Be—Cu alloy while still using G-10 as the substrate material, the CTE mismatch would increase to (12+15)/2−8=5.5 ppm/° C. (6.5 ppm/° C. for the low end of the titanium alloy CTE at 7.0 ppm/° C.). This will result in an increase (worsening) of the sensitivity of the transducer to temperature changes. In order to reduce the sensitivity, a substrate with a CTE matching the titanium electrodes is required. There are several ceramic materials that are close matches. When considering candidate materials, it is important to obtain TCE data that represents the material at the temperature range that the transducer will be operated, which is generally room temperature, or about 25° C. Since ceramic materials are often used at high temperatures, their TCE is also often specified at high temperature. For example, Macor, a machinable ceramic produced by Corning, has an average CTE over the temperature range of 25 to 800° C. of 12.6 ppm/° C., but at 25° C. the CTE is about 8.1 ppm/° C., making it an ideal material to match the CTE of the titanium alloys. Since stem 120 may also be made of Macor, the entire transducer will be well matched with respect to CTE, and temperature sensitivity will be greatly improved over the prior art. Other suitable substrate materials include Rescor 960 machinable alumina ceramic from Cotronics, and various hard fired alumina and other ceramics available from suppliers of hybrid circuit materials. The hard fired ceramics are not machinable by normal cutting tools, but may be machined with diamond tools or cut by laser. In large volumes, the hard fired ceramics are cheaper as they can be easily fabricated by casting and pressing techniques, followed by a high temperature firing step, as is commonly used to form clay products. The material cost of the machinable ceramics is higher than the hard fired material, but for prototypes and small quantities the machinable ceramics are preferred due to the high set up cost and longer lead time of the hard fired ceramics. An alternative metal that may be used when thermal stability is more important than low mass is molybdenum. Molybdenum has a CTE of 5.4 ppm/° C. at 25° C., but the density is 10.2 g/cc. Some hard fired alumina substrates have a TCE in the range of 5 to 6 ppm/° C., making them a good match to molybdenum. It is important that shields 70 and the drive electrodes, as well as rotor plate layers 47B, 47T be of material with a CTE that matches the substrate material.

Figure 10A:
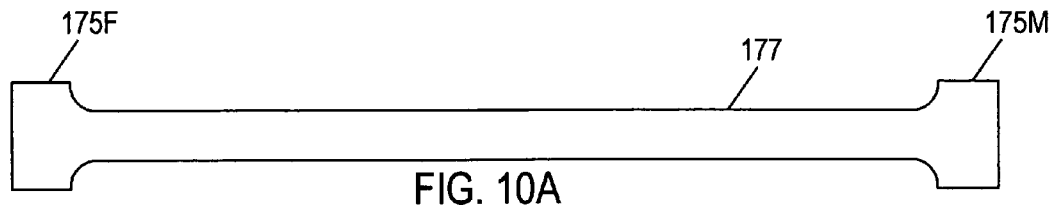
FIGS. 10A-10E illustrate a buckling problem in transducers with springs from the prior art transducer.
Figure 10B:
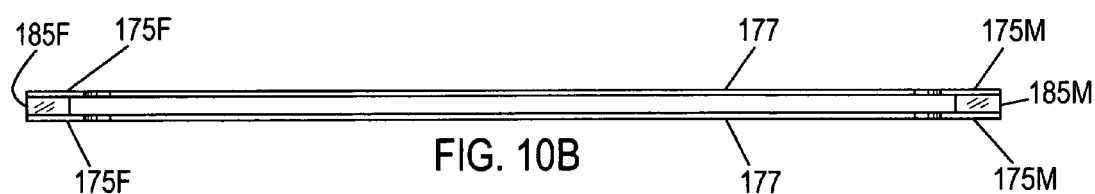
Figure 10C:
Figure 10D:
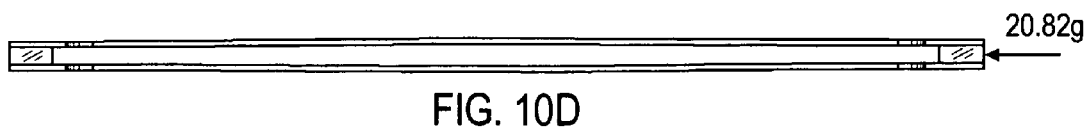
Figure 10E:

Buckling of the support springs was mentioned as a problem with the prior art transducer. Buckling is a phenomena where a beam or spring supporting an axial load suddenly collapses by bending outward in a direction normal to the applied load. The load required to initiate buckling is determined by the dimensions and material properties of the spring. The tendency to buckle increases rapidly as the spring becomes thinner with respect to the length. This makes buckling especially problematic for very sensitive transducers requiring very thin springs, but it can be a problem for any transducer that contains a movable member supported by flexible spring like elements. As is visible in FIGS. 4, 6, and 7, springs 77 of the current transducer are wider in the center than at the ends. Observation of the bending behavior of springs as used in this and similar transducers will help in understanding how the shape of springs 77 increases the resistance to buckling. FIG. 10A shows a plan view of a spring similar to those of the prior art transducer. Spring 177 has a simple, straight rectangular shape, except for radii at both ends to distribute the stress over a wider region to reduce the stress in the adhesive bond layer (not shown). The bond layer stress reduction will be explained in more detail below, in the description of an embodiment optimized for operation at higher loads. Fixed spring anchor 175F and movable spring anchor 175M include the stress distribution feature. The length of spring 177 is 3.43 mm, measured over the portion of uniform width. The width is 193 µm, the thickness is 25 µm. The radius of the curved stress distribution feature is 125 µm. FIG. 10B shows a side view. Fixed core 185F is bonded to fixed spring anchors 175F The thickness of the cores is 75 µm. In an actual transducer, core 185F and anchors 175F would be attached to the rotor frame, and so would be fixed with respect to the entire outer portion (frame) of the transducer. Movable spring anchors 175M are bonded to movable core 185M. In an actual transducer, core 185M and anchors 175M would be attached to the rotor, and be free to move up and down. FIG. 10C shows the vertical (Z-axis) deflection of the springs as they would function in normal operation of the transducer. The deflection as shown in FIG. 10C is magnified 4 times. The actual deflection for springs of the specified dimensions, with a 0.1 gram load is 53 µm. Since there are eight sets of springs in the transducer (four sets for each of two rotors), the load on the transducer required to deflect the rotor 53 µm would be 0.8 grams. Inspection of the shape of the springs in FIG. 10C shows that the majority of the bending occurs near the ends, where spring 177 is attached to anchors 175F, 175M. The portion near the center of the spring is relatively flat. FIG. 10D and FIG. 10E show the springs under the influence of an axial load, as can occur from stresses induced during the manufacture of the transducer, or from sideways forces on the transducer during its operation. In FIG. 10D the axial load is 20.82 grams, and a slight outwards bulging of 9.7 µm at the center of the springs is visible. In FIG. 10E, the load has increased by 0.6% to 20.95 grams, and the bulge has increased drastically, to 147 µm. This sudden outward deflection of the springs at a certain load, about 20.9 grams in this case, is what is known as buckling. At the least, buckling causes an unstable, poorly defined motion in the Z-axis, rendering the transducer inaccurate, and at worst, the springs may be overstressed and permanently bent so as to be completely useless. FIG. 10E shows that buckling causes both the center and the ends of the springs to bend.

Figure 11A:
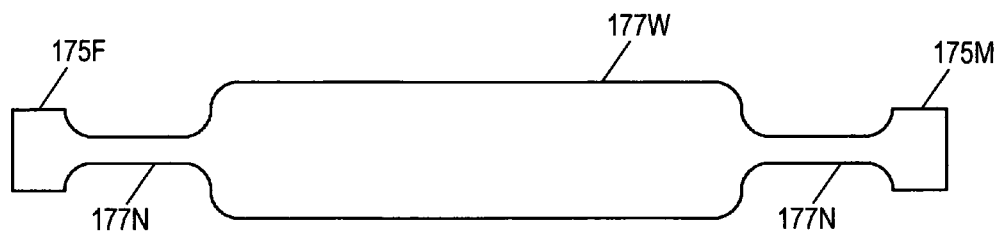
FIGS. 11A-11E illustrate an improved spring design with a buckling resistant feature.
Figure 11B:
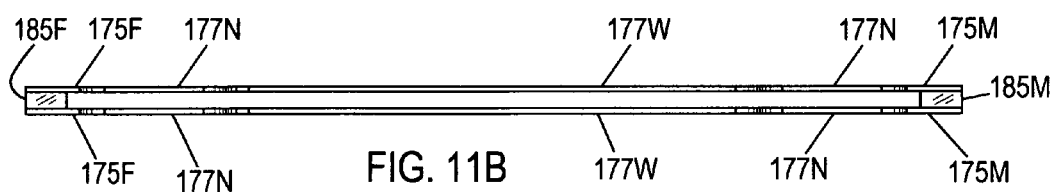
Figure 11C:
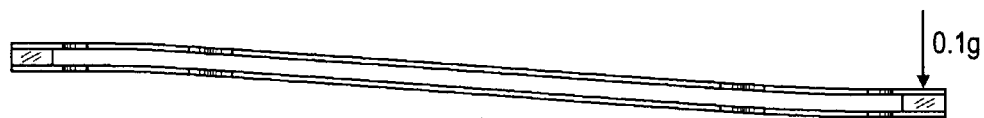
Figure 11D:
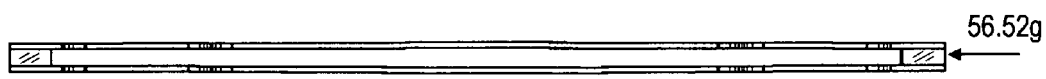
Figure 11E:
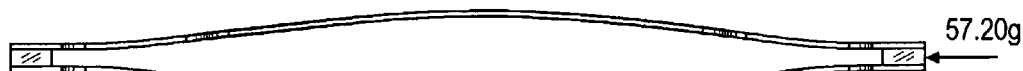

That bending characteristic, that under normal operation the springs bend mostly at the ends, and not at the center, but under buckling the springs also bend at the center, is the key to increasing the resistance to buckling without increasing the vertical stiffness of the springs. It is important to keep a low vertical stiffness for the transducer to have a high sensitivity to force is the desired Z-axis direction. FIG. 11A shows a plan view of a first means of increasing the buckling resistance without increasing the vertical stiffness of the springs. Straight spring section 177 (of width 193 μm) has been replaced by central wide spring section 177W (635 μm wide) and narrow end spring sections 177N (127 μm wide). The overall length of section 177W plus the two sections 177N is the same as the length of original section 177 (3.43 mm). The length of sections 177N are 380 μm each, and the length of section 177W (including the curved sections joining it to the narrow spring sections) is 2.67 mm. Replacing 70% of the original spring section length with a much wider, and therefore stiffer section at the center required reducing the width of the remaining narrow sections at the ends by 34% to keep the vertical stiffness the same. The wide section 177W about the center portion of the spring increases the resistance to buckling by increasing the force required to bend the spring outward in the middle, while increasing the resistance to the desired motion by a much smaller amount. A slight reduction in width of the narrow sections keeps the vertical stiffness at the desired value. FIG. 11B shows an edge view of the improved spring with no applied load. FIG. 11C shows the improved spring with 0.1 gram of vertical load (in the direction of operation of the transducer), and shows that the deflection is the same as the original spring. FIG. 11D shows the improved spring under an axial load of 56.52 grams, just before buckling. FIG. 11E shows the improved spring with an axial load of 57.2 grams, just after buckling. The improvement has increased the buckling resistance of the spring from 20.9 to 57 grams, an increase by a factor of 2.73, obtained at no additional cost, since the etching process can produce the spring of FIG. 11A at the same cost as the spring of FIG. 10A.

Increasing the width of the central portion of the springs is only one means of increasing the resistance to buckling. Any means of increasing the stiffness of the central portion of the spring will increase the resistance to buckling. Even more effective than increasing the width is increasing the thickness, since the stiffness only increases linearly with width, but with the third power of thickness. There are many ways to increase the thickness of the central portion of the springs. Some examples are the lamination of additional layers to the central portion of the springs, electroplating additional material onto the central portion of the springs, and partial etching of the springs, by starting with a material of greater thickness than desired for the spring, but equal in thickness to the desired thickness of the thicker portion, with the spring sections at the ends reduced to the desired thickness by etching. All of these various means have advantages and disadvantages. They can all provide a greater increase in buckling resistance than from only increasing the width of the central portion of the spring, but they all add more cost to the transducer as well. Laminating additional layers may be the least costly of the three, but the adhesive required for the lamination process may introduce creep and hysteresis if the joint is not properly designed. Electroplating removes the possibly undesirable effects of adhesive, and is easy to do is the springs are a Be—Cu alloy, but may be more difficult if the springs are a titanium alloy, due to adhesion issues between the plated material and the titanium. Also, since titanium cannot be deposited by electroplating, the deposited material will most likely have a mismatched CTE with the titanium spring, which could add undesired thermal sensitivity to the transducer. Finally, the partial etching means has none of the performance degradation issues of the other two, but obtaining the desired spring stiffness is more difficult because the etching introduces a variation in the spring thickness, and since the stiffness varies with the cube of the spring thickness, extremely tight control of the etching process is required.

Figure 12A:
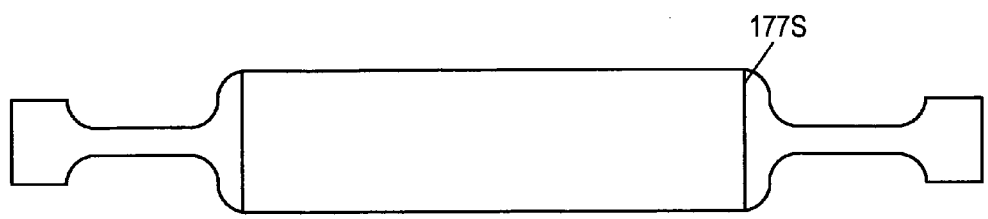
FIGS. 12A-12C illustrate a second buckling resistant feature.
Figure 12B:
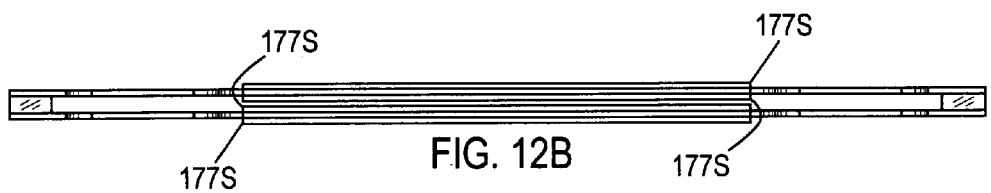
Figure 12C:
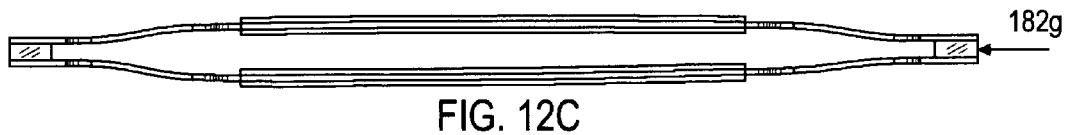

FIG. 12A shows a plan view of springs modified to increase the thickness as well as the width. The thickness is increased by adding stiffening sections 177S to central spring portions 177W. Stiffening section 177S does not cover the entire surface of central spring portion 177W, but only the portion of maximum width. The portions that curve down in width to match narrow springs 177N are left uncovered by thick section 177S. This illustrates the proper joint detail used to minimize creep and hysteresis effects if sections 177S are adhesively bonded to sections 177W. If sections 177S are fabricated by partial etching or plating, sections 177S may cover all of sections 177W. FIG. 12B shows a side view of the further improved spring. Added sections 177S are the same width as sections 177W, and are also 25 μm thick. This triples the total thickness of the central portion of the springs, increasing the stiffness by a factor of 27 over the spring of FIGS. 11A-11E. FIG. 12C shows the further improved spring under an axial load of 182 grams. The spring is just starting to exhibit buckling at 163 grams axial load. Buckling increases gradually as the axial load is increased from 163 to 180 grams, then increases drastically beyond 180 grams. Taking 163 grams as the maximum tolerable axial load, the improvement in resistance to buckling has increased 163/20.9=7.8 times over the original spring without the buckling resistant features, with no increase in vertical stiffness. Stiffening sections 177S could be applied to only one side of spring sections 177W, with a slight decrease in effectiveness in reducing buckling. Note that stiffening sections 177S do not need to be created by a process that literally adds them to an existing structure, they can also be created by removing material from the end sections 177N, as by partial etching.

In the description of the first preferred embodiment, it was disclosed that the rotor plate in the section of the transducer used for electrostatic actuation may be grounded. This would allow a much simpler construction of top rotor plate layer 47T, as tabs 78, 88 can be eliminated and spring anchors 75, 85 connected directly to frames 76, 86, without the electrical isolation employed in the first preferred embodiment. In the first preferred embodiment, where bottom rotor plate 48B functions as a pickup electrode, there is little point in fabricating the top rotor as just discussed, because the bottom rotor must be isolated from its frame, and it is generally easier to make both rotors identical. It is possible, however, to perform the position sensing function with a transducer in which the rotor plate is grounded. With prior art circuitry, such a transducer had rather poor linearity of the output signal versus displacement, but an embodiment of the circuitry in U.S. Pat. No. 9,960,945 titled High-Performance Drive Circuitry For Capacitive Transducers, provides excellent linearity. The second preferred embodiment of the transducer of this invention makes use of the availability of this circuitry, allowing both rotor plates to be grounded without any linearity penalty. With both rotor plates grounded, the stem connecting he two rotor plates together no longer needs to be insulating, and so may be made of metal. The following description of the second preferred embodiment of the transducer of the current invention is also directed at a transducer of about 12.5 mm width and length, with a load capacity of about 1 gram. This simplifies the description, as many items are identical between the first and second preferred embodiments. These identical items retain the original identification numbers used in the description of the first embodiment. Similar but slightly modified items use the identifying number from the first embodiment, incremented by 200, whenever possible.

Dimensions and materials in the second preferred embodiment are the same as the first, except as specified in the following description.

Figure 13:
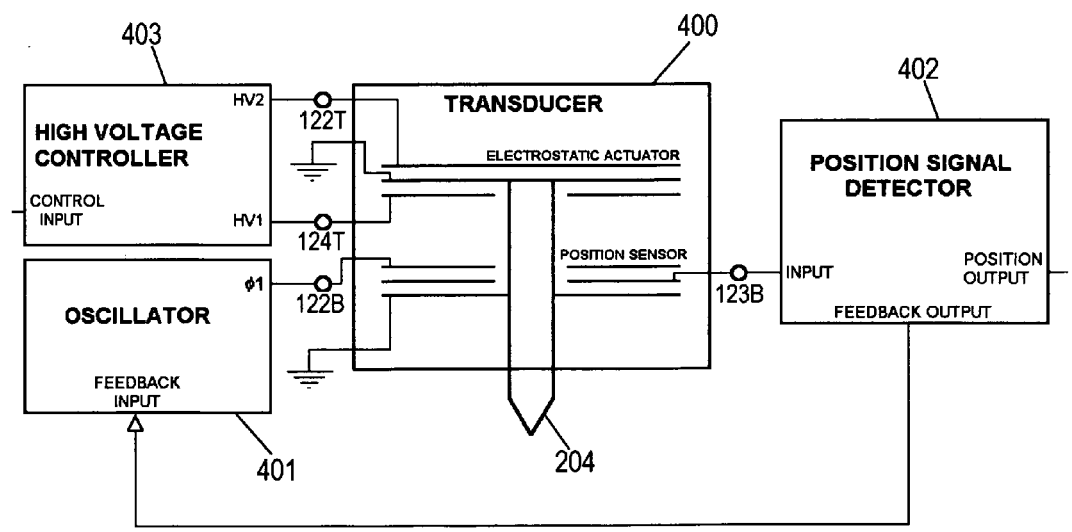
FIG. 13 is a block diagram of the circuitry used with the transducer of the second embodiment.

FIG. 13 shows a schematic/block diagram of the transducer of the second preferred embodiment. Inspection of transducer 400 shows that the electrostatic actuation electrodes are arranged in the same way as in the first embodiment (refer to FIG. 9 as needed). High voltage controller 403 is shown with only two high voltage outputs, and the rotor of the electrostatic actuation section of transducer 400 is grounded. Oscillator 401 has only one output, and includes a feedback input from position signal detector 402. The feedback adjusts the amplitude of the oscillator output to improve the linearity of the position sense output signal. Note that the rotor plate of the position sensor section of transducer 400 is now the lower most electrode, rather than the center electrode, and is grounded. The center electrode is still the pickup electrode, which provides the sense signal to position signal detector 402, but the pickup/center electrode is now fixed with respect to the drive electrode. There is only one drive electrode in the position sensor section of transducer 402, and it is located at the top of that section.

Figure 14:
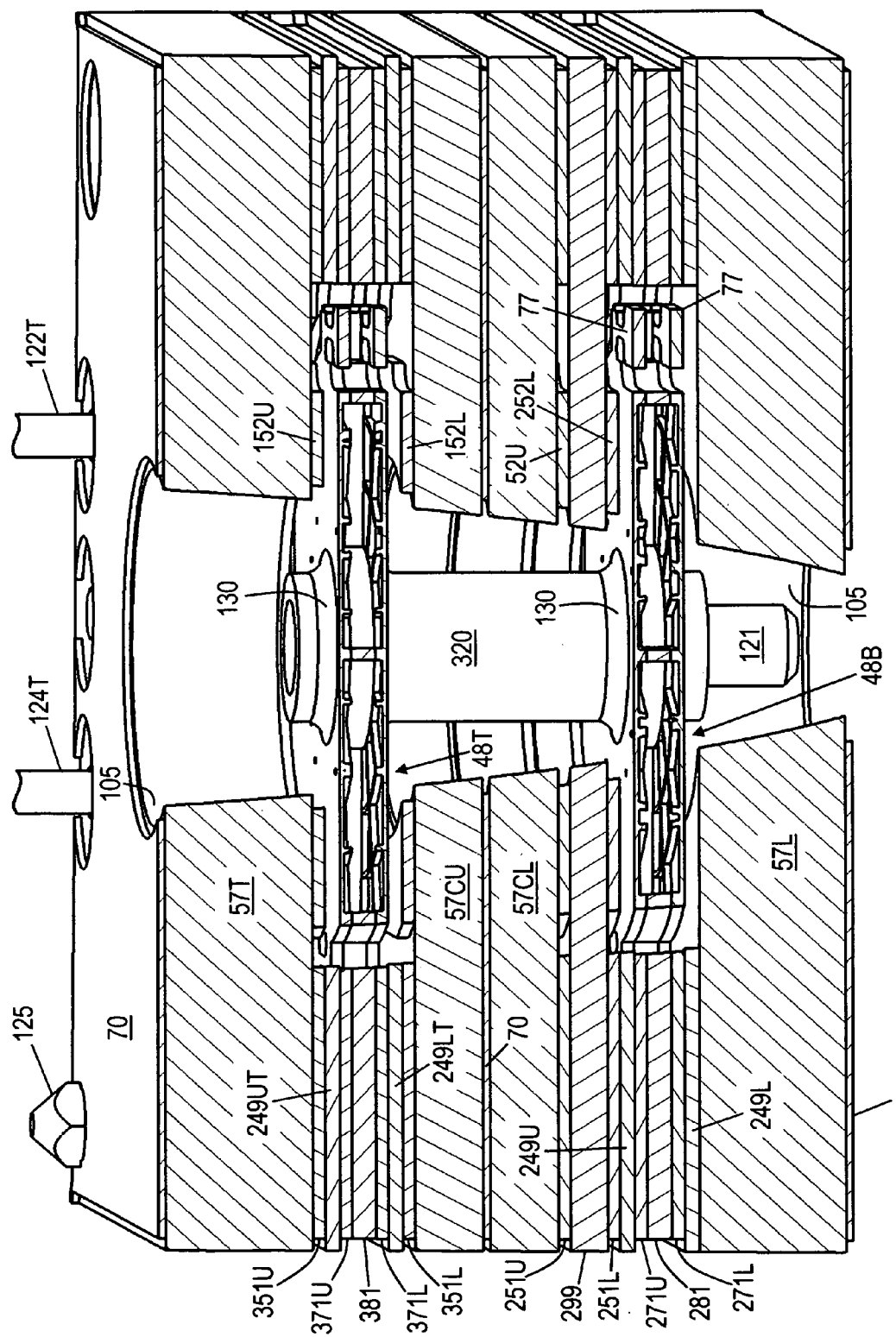
FIG. 14 is a sectional view of the transducer of the second embodiment.
Figure 15:
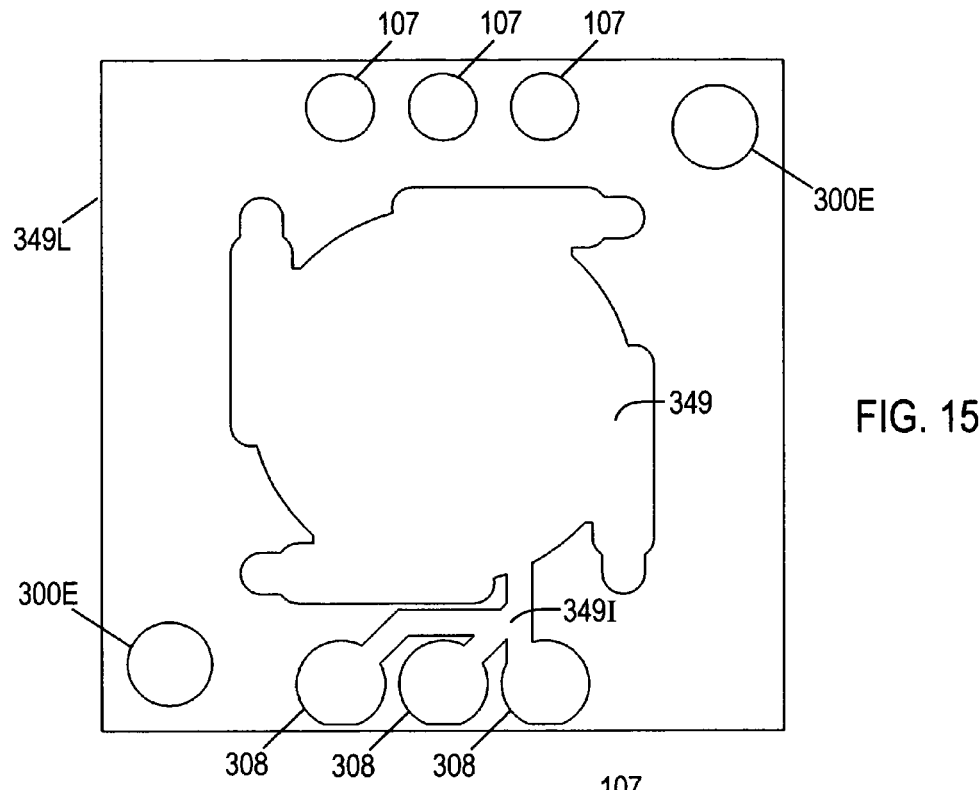
FIG. 15 is a plan view of an etched metal spacer of the transducer of the second embodiment.
Figure 16:
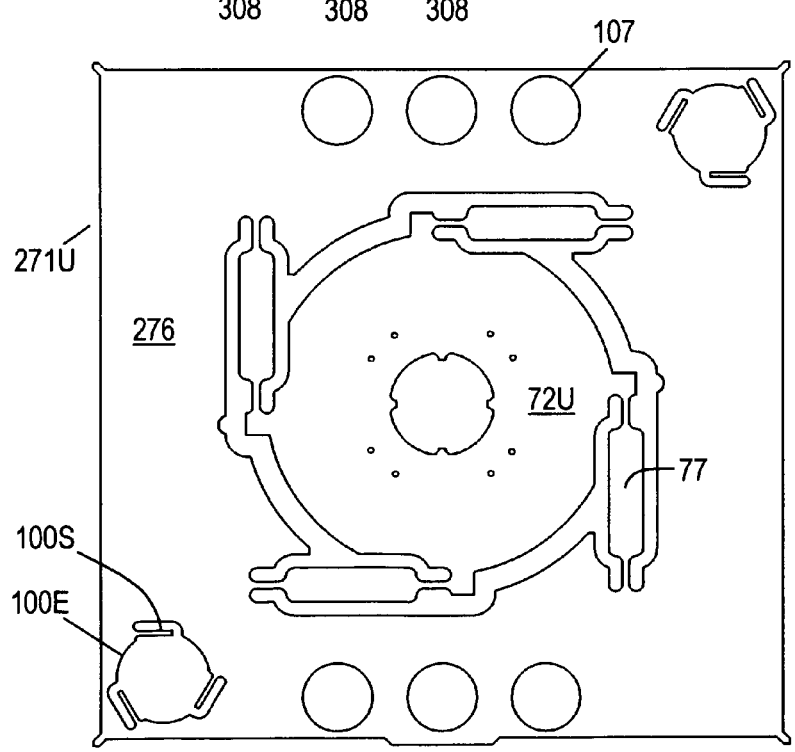
FIG. 16 is a plan view of the rotor skin layer of the transducer of the second embodiment.
Figure 17:
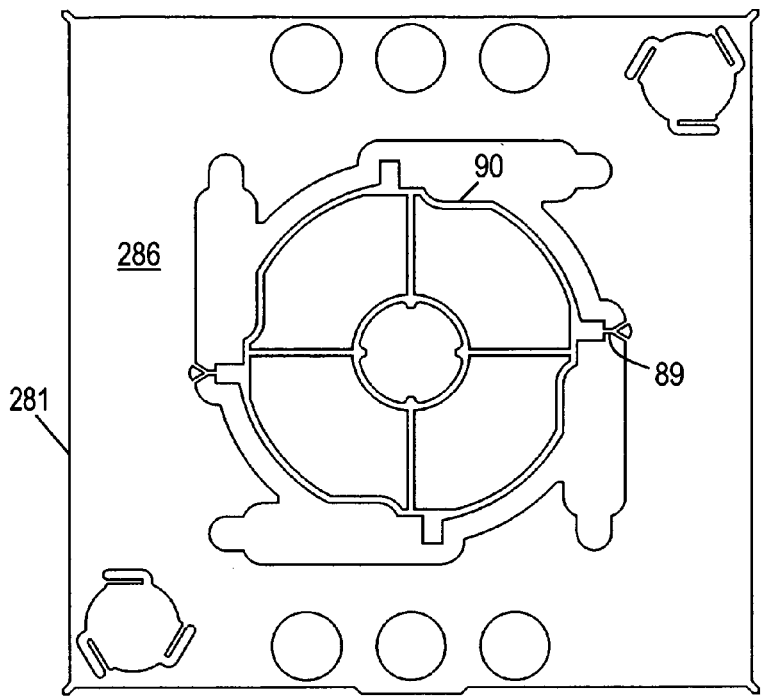
FIG. 17 is a plan view of the rotor core layer of the transducer of the second embodiment.
Figure 18:
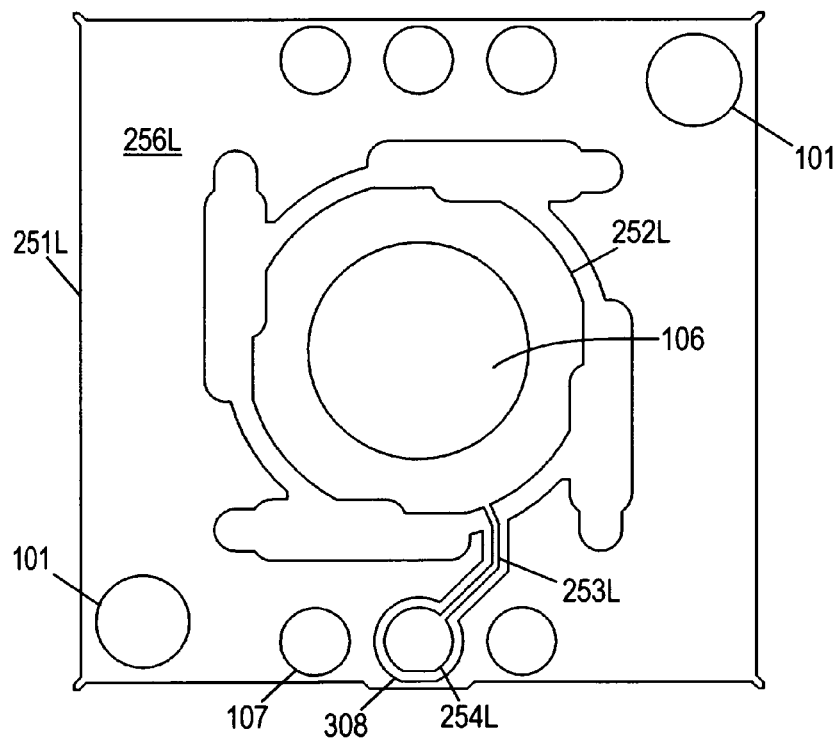
FIG. 18 is a plan view of the pickup electrode layer of the transducer of the second embodiment.

FIG. 14 is a sectional view of the transducer of the second embodiment, showing the two rotors partially cut away, as well as the various substrates, spacers and electrode layers. Bottom rotor plate 48B and top rotor plate 48T are the same as in the first embodiment. Substrates 57L, 57CL, 57 CU, and 57T, shields 70, stud 121, glue 130, and springs 77 are also the same. Top upper drive electrode 152U and top lower drive electrode 152L, used for electrostatic actuation, are the same as in the first embodiment. Stem 320 may be constructed of metal, which is cheaper than Macor, and also stronger. If the substrates are of G-10 circuit board material, aluminum is a good choice for stem 320. If the substrates are Macor or some other ceramic, titanium is a better choice for TCE matching to minimize temperature sensitivity. Note that there is no drive electrode below bottom rotor plate 48B. Pickup electrode 352L is constructed the same as bottom lower drive electrode 52L of the first embodiment, but pickup electrode 352L is located just above rotor plate 48B. Bottom upper drive electrode 52U is the same as in the first embodiment. The mechanical travel of the rotors, as well as the rotor to drive electrode gaps for the electrostatic actuation section, and rotor to pickup electrode gap for the position sense section is set by the thickness of spacers 249L, 249U, 249LT, 249UT. The spacers of this embodiment are preferably constructed of etched metal with the same TCE as the electrode metal. The metal spacers may be fabricated by the same etching process used to fabricate the rotor plate layers.

The differences in the spacers and electrodes in the second embodiment (compared to the first embodiment) are visible in FIG. 15 to FIG. 21. The individual items are described in the order they are positioned in the position sensor section (which is the lower section) of the transducer, starting with spacer 249L and moving up. Spacer 249L includes central opening 349, and trace isolation channel 349I. Opening 349 provides space for the rotors to move up and down. Isolation channel 349I connects opening 349 to holes 308, providing clearance so that the traces in the drive and pickup electrodes do not short to the metal spacer. Pin clearance holes 107 are identical to those in the first embodiment. Contact pad clearance holes 308 are large enough in diameter (preferably abut 1.65 mm) to provide electrical isolation from the contact pads of the drive and pickup electrodes, which preferable have a diameter of about 1.27 mm. All three holes 308 on the side of spacer 349L cooperating with the contact pads of the drive and pickup electrodes are sized to clear the pads, and isolation channel 349I connects to all three holes, so that the same spacer pattern may be used for all four spacer layers. Spacers 249U, 249LT, and 249UT are identical to spacer 249L, other than position and orientation. As with the first embodiment, the elements of the top section of the transducer are rotated 180 degrees with respect to the bottom half, so that the pins for each section are located on opposite sides of the top surface of the transducer. Alignment holes 300E are preferably formed by etching, in the same process that forms the rest of the part. Holes 300E may be simple round holes as shown, since the alignment accuracy required for the spacers as less than that required for the rotor plate sheets, or, springs 100S may be included, for the best possible alignment.

Upper rotor plate skin layer 271U is similar to upper rotor plate skin layer 71U of the first embodiment. Since the rotor is grounded in this embodiment, isolated spring anchors 75 and pads 78 are not required. Springs 77 attach directly to frame 276. Rotor plate skin 72U is the same. Pad 74 and trace 73 are not included. The ground connection is made to the frame by pin 125B installed in one of holes 102 (see FIG. 4). Pin clearance holes 107 are included in six places. Etched alignment holes 100E, including springs 100S are the same as in the first embodiment. Lower rotor plate skin layer 271L is identical to upper skin layer 271U, except for the ribs and pockets on the inside surface of rotor plate skin 72L, which is mirrored from rotor plate skin 72U, the same as in the first embodiment.

Rotor core layer 281 (FIG. 17) has rotor core 90 and tabs 89 which are the same as in the first embodiment. Rotor core frame 286 has the same features as rotor plate skin layer 276.

Pickup electrode layer 251L (FIG. 18) is similar to lower drive electrode layer 51L of the first embodiment. Since the rotor plates are grounded and isolated spring anchors are not required, supports 55L are not isolated, and are incorporated into frame 256L. Pickup electrode 252L is the same shape as drive electrode 52L, but is located above rotor plate 48B. Trace 253L connects electrode 252L to pad 254L, which is connected to front center electrical interconnect pin 123B (FIG. 4). Hole 102 for pin 123B is not shown in pad 254L in FIG. 18, as holes 102 are drilled through the entire transducer after the final assembly. As in the first embodiment, if the substrate material is G-10 printed circuit board laminate, layer 251L, as well as shields 70 and other stator (non-rotor) electrodes are preferably made of copper, etched to shape in place on the substrates. In this case, holes 101 are made slightly larger than alignment holes 100 which are drilled in the substrate after etching the electrodes. Likewise, hole 106 in at the center of pickup electrode 252L is slightly larger than stem clearance hole 105 which is also drilled in the substrates.

Figure 19:
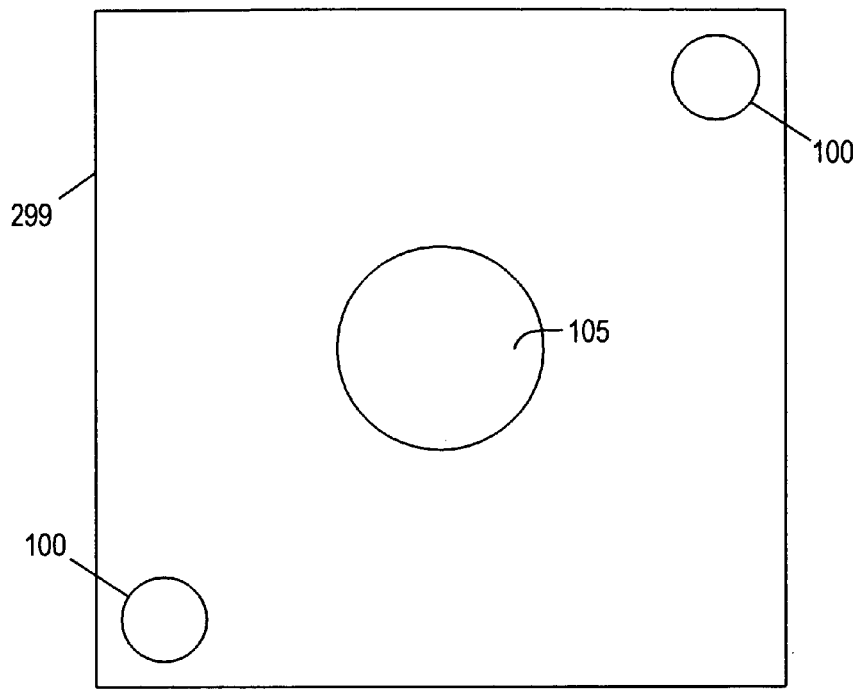
FIG. 19 is a plan view of the fixed electrode spacer of the transducer of the second embodiment.
Figure 20:
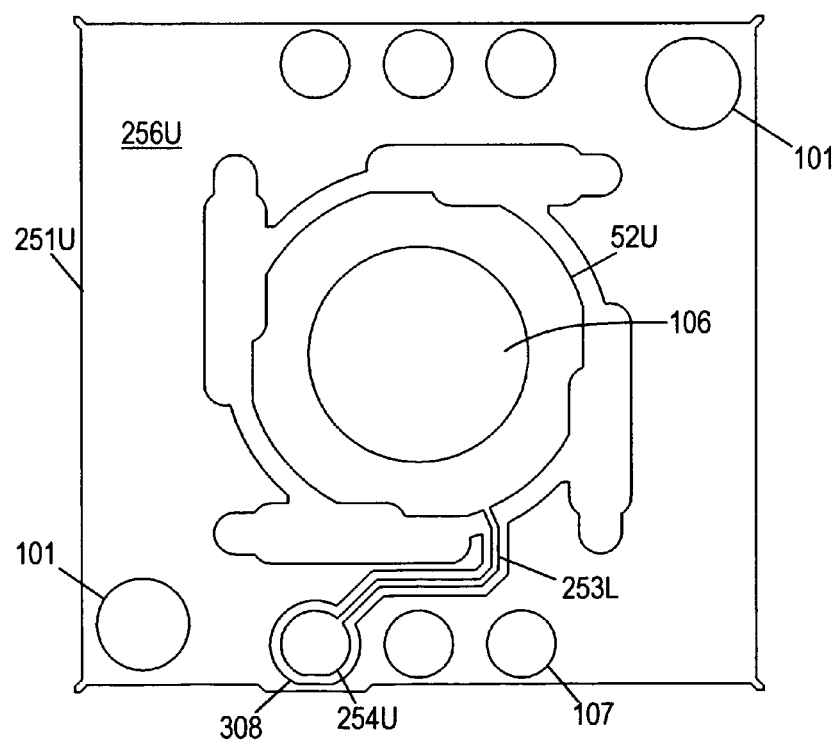
FIG. 20 is a plan view of a drive electrode layer of the transducer of the second embodiment.

Position sense electrode dielectric spacer 299 is shown in FIG. 19. Spacer 299 includes alignment holes 100 and stem clearance hole 105. Spacer 299 is the dielectric for the capacitor formed by electrode 252L and 52U (FIG. 20). For maximum sensitivity, The capacitance between drive electrode 52U and pickup electrode 252L should be about equal to the capacitance between pickup electrode 252L and rotor plate 48B. Since the effective electrode area for both capacitors is about the same, and the gap between the pickup electrode and rotor is set by the thickness of spacer 249U, the thickness of spacer 299 should be the relative dielectric constant of spacer 299 times the thickness of spacer 249U. Assuming the relative dielectric constant is about 4 (typical for G-10 material), and spacer 249U is 50 μm thick, spacer 299 should be about 200 μm thick.

Position sense drive electrode layer 251U is shown in FIG. 20. It includes frame 256U, pin clearance holes 107 in five places, pad clearance hole 308, pad 254U, trace 253U and drive electrode 52U. drive electrode 52U includes hole 106. Pad 254U connects drive electrode 52U to pin 122B, via trace 253U.

All of the layers used in the position sense section of the transducer have now been described. The layers are assembled in the same manner as in the first embodiment.

Figure 21:
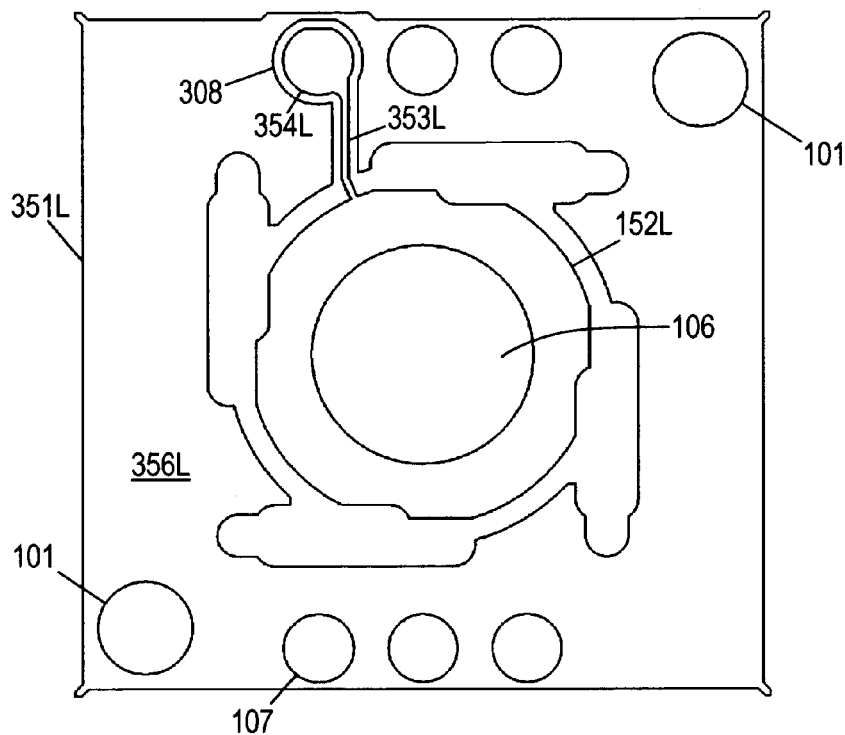
FIG. 21 is a plan view of a second drive electrode layer of the transducer of the second embodiment.

Lower drive electrode layer 351L of the top (electrostatic action) section of the transducer is shown in FIG. 21. Electrode layer 351L contains drive electrode 152L which is identical to that part in the first embodiment. Other identical features are pin clearance holes 107 in five places, holes 101, and stem clearance hole 106. Features similar to those in the first embodiment are frame 356L, pad clearance hole 308, pad 354L, and trace 353L. Spacer 249LT is identical to spacer 249L. Spacer 249UT is identical to spacer 249U. Electrode and core layers 371L, 381, 371U, and 351U are identical to those layers in the bottom section with identification numbers 100 less than those of the top section. Note that the layers in the top section are rotated 180 degrees from those in the bottom section.

Figure 22:
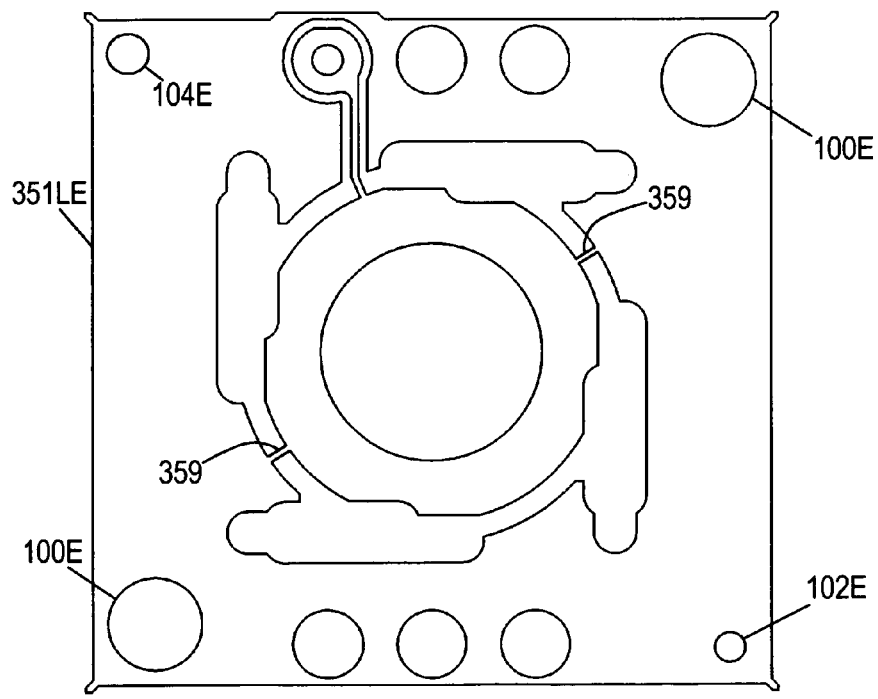
FIG. 22 is a plan view of an alternative construction for the drive electrode layer of FIG. 21.

In case the greater temperature stability and/or lower moving mass obtained by using a ceramic substrate with a TCE matched to a titanium alloy is desired, it is preferable to modify the assembly process somewhat from that described in the description of the first embodiment. While it is possible to bond the titanium alloy foil sheets to the ceramic substrates and etch them in place, which is the preferred method for the copper electrodes on the G-10 substrate material, etching titanium requires the use of hydrofluoric acid, which tends to attack the ceramic substrates as well as the titanium metal. Another issue is that the ceramic is brittle, so that drilled interconnection pin holes 102 are not desired in the substrates. Instead, slightly larger holes are drilled in the substrates, to provide a slip fit for the square end of the electrical interconnect pins. Since the drilled holes in the substrate are larger than etched holes 102E (FIG. 22), protecting the metal overhanging the holes in the substrate during the metal layer etching is an issue. For these reasons, it is preferable to etch the titanium alloy electrodes and shields as free-standing sheets, and then laminate them to the ceramic substrates. Doing so requires a few changes from the method of etching in place on the substrate. Lower electrostatic drive electrode layer 351LE (FIG. 22) shows the changes required to electrode 351L to allow etching in the free-standing condition and laminating to the substrate after etching. Only the differences are specifically identified. Etched alignment holes 100E, with a diameter to closely match the alignment pins used during the assembly process, are slightly smaller in diameter than etched clearance holes 101. Tabs 359 hold drive electrode 152L in place to frame 356L until after layer 351 LE is laminated to the substrate, at which point, tabs 359 are removed by cutting away with a small end mil, or by any other suitable means. Etched ground strap hole 104E, and etched ground pin hole 102E are formed with the etching process. It should be apparent to those skilled in the art how to modify the other etched metal layers in a corresponding manner.

Higher force transducers may be obtained by slight modifications in the dimensions specified in the previous descriptions of the first and second embodiments. The load capacity of the transducer in measuring an externally applied load can be increased significantly by simply increasing the thickness of springs 77. Since the spring stiffness is proportional to the cube of the thickness, doubling the thickness to 50 μm increases the load capacity from about 1 gram to about 8 grams. Decreasing the length and/or increasing the width also increases the stiffness. In order to increase the electrostatic force generation capability, it is necessary to increase the electrode area or decrease the electrode gap. The force is proportional to the electrode area and the square of the quantity voltage divided by gap. The transducer with a width and length of 12.5 mm as previously described will generate about 1 gram of force with a 50 μm electrode gap and 600V applied between the electrodes. As the electrode gap is decreased, the maximum allowable applied voltage before breakdown decreases, but the decrease is not directly proportional to the decrease in gap, so the force generation capacity increases as the gap is reduced. For example, at a 10 μm gap, it is possible to apply about 330V between the electrodes, and the force will be about $(1 \text{ gram}) \times (330/600)^2 \times (50/10)^2 = 1 \times 0.3025 \times 25 = 7.56$ grams. Of course, building the transducer with a gap of only 10 μm requires excellent control of electrode flatness and cleanliness during assembly. It also limits the operating range of the transducer to about ±3 μm, due to an electrostatic instability that occurs at an electrode displacement of ⅓ the nominal gap. By increasing the overall length and width from 12.5 mm to 20 or 25 mm, the electrode area can be increased by a factor of 5 or 10, since the size of the springs and frames do not need to increase in proportion to the width. This results in disproportionately more electrode area being available as the size of the transducer is increased.

A third embodiment, optimized for significantly higher loads, will now be described. The specified dimensions are for a transducer with a load capacity of 1000 grams. Since this is currently significantly greater than the force that can be generated by electrostatic actuation, this embodiment is shown without the electrostatic actuation drive electrodes. The top section includes the drive electrode, pickup electrode, and rotor plate, which may function directly as a target electrode for position sensing (which the stiffness of the springs converts to force sensing), or a separate unstressed target electrode may be added in addition to the rotor plate, for better linearity. The bottom section includes the rotor plate layer without position sensing electrodes, to constrain the motion to the vertical axis only, so that off center or off axis loads do not result in excessive errors in the measurements. Position sensing electrodes could be included in the lower section as well, which would provide slightly better performance in terms of lower electrical noise and lower temperature sensitivity, but the improvement is rather limited and generally not worth the additional cost.

Since low moving mass is usually not as important at higher loads such as for this embodiment, the rotor plates are solid structures formed from a single layer of etched metal, but the hollow core structure could be used if desired. Because of the greater thickness of the springs in this embodiment (400 μm versus 25 μm), buckling of the springs is not usually a problem, so the springs are shown without the buckling resistant features, but these features would be beneficial in the current embodiment if the transducer were subject to large side loads. Because of the higher loads, the glued connection used to fasten the stem to the rotor plates in the first two embodiments is not sufficiently strong or stable. In this embodiment, the stem is fastened to the rotor plates by a small machine screw.

Figure 23:
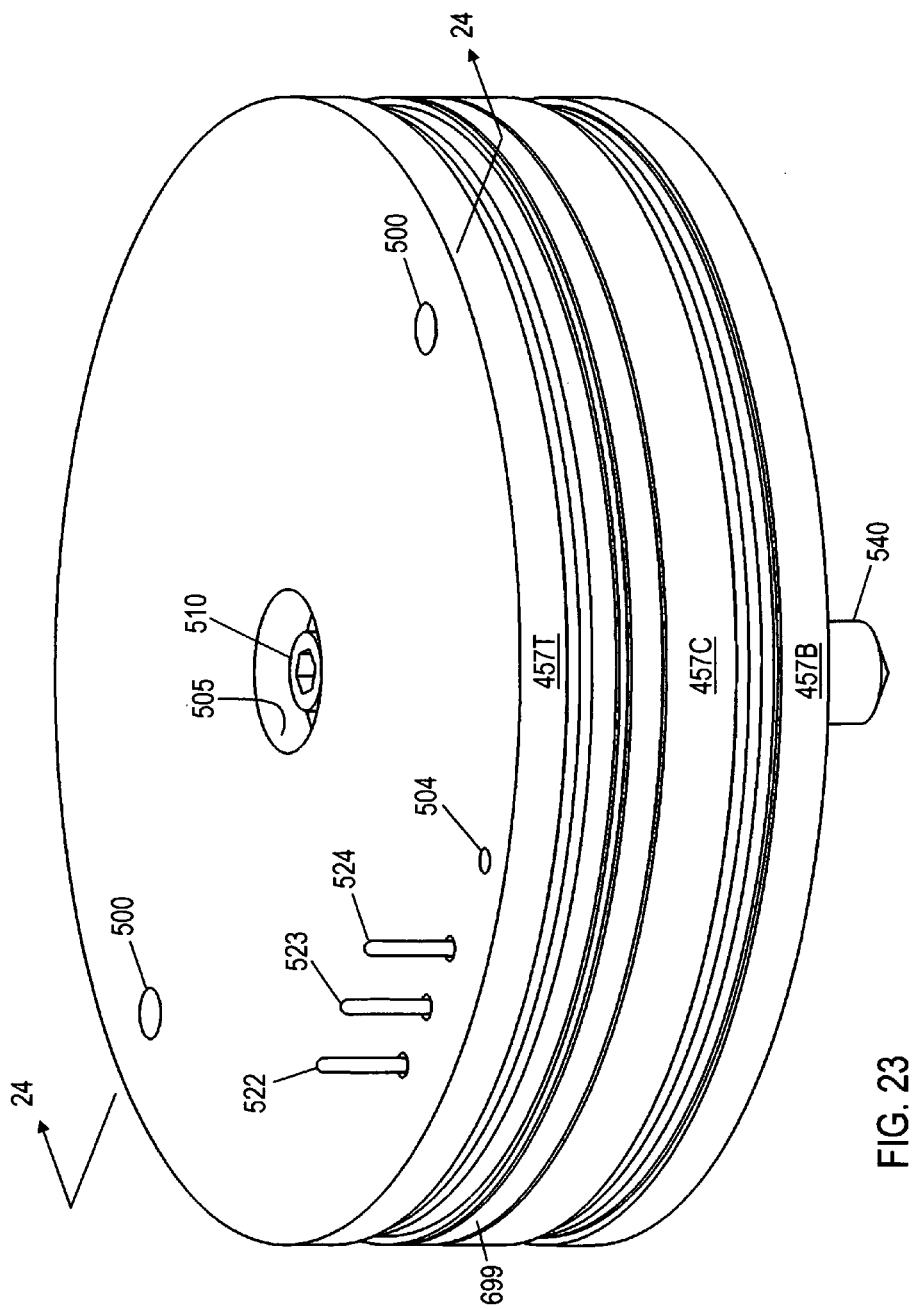
FIG. 23 is an isometric view of the transducer of the third embodiment.

FIG. 23 shows an isometric view of the completed transducer. The diameter is 1.4 inches and the thickness is 0.4 inch. The various layers are aligned during assembly by alignment holes 500 as in the previous embodiments. Ground contact hole 504 is also the same as in the previous embodiments, being preferably 0.031 inch diameter to produce an interference fit with the four corners of a 0.025 inch square pin (not shown, but same as pin 125 of previous embodiments except longer). The pin is pressed into hole 504 after all layers of the transducer are bonded together, providing electrical connection between all of the shield layers and frames, which are connected to the ground of the drive circuit by interconnect pin 522. pin 523 connects the pickup electrode signal from the transducer to the drive circuit, and pin 524 connects the drive signal from the drive circuit to the drive electrode of the transducer. Bottom cover substrate 457B, center spacer substrate 457C, electrode dielectric spacer 699, and top cover substrate 457T are preferably formed from G-10 printed circuit board substrate material. The material is preferably obtained with thin copper foil laminated to it. The copper foil is used to form shields 470, drive electrode layer 610, and pickup electrode layer 620, which will be described in more detail below. Stem clearance hole 505 has the same function as hole 105 in the previous embodiments, but is 0.2 inch diameter. Screw 510 may be a 0-80 socket head cap screw.

Figure 24:
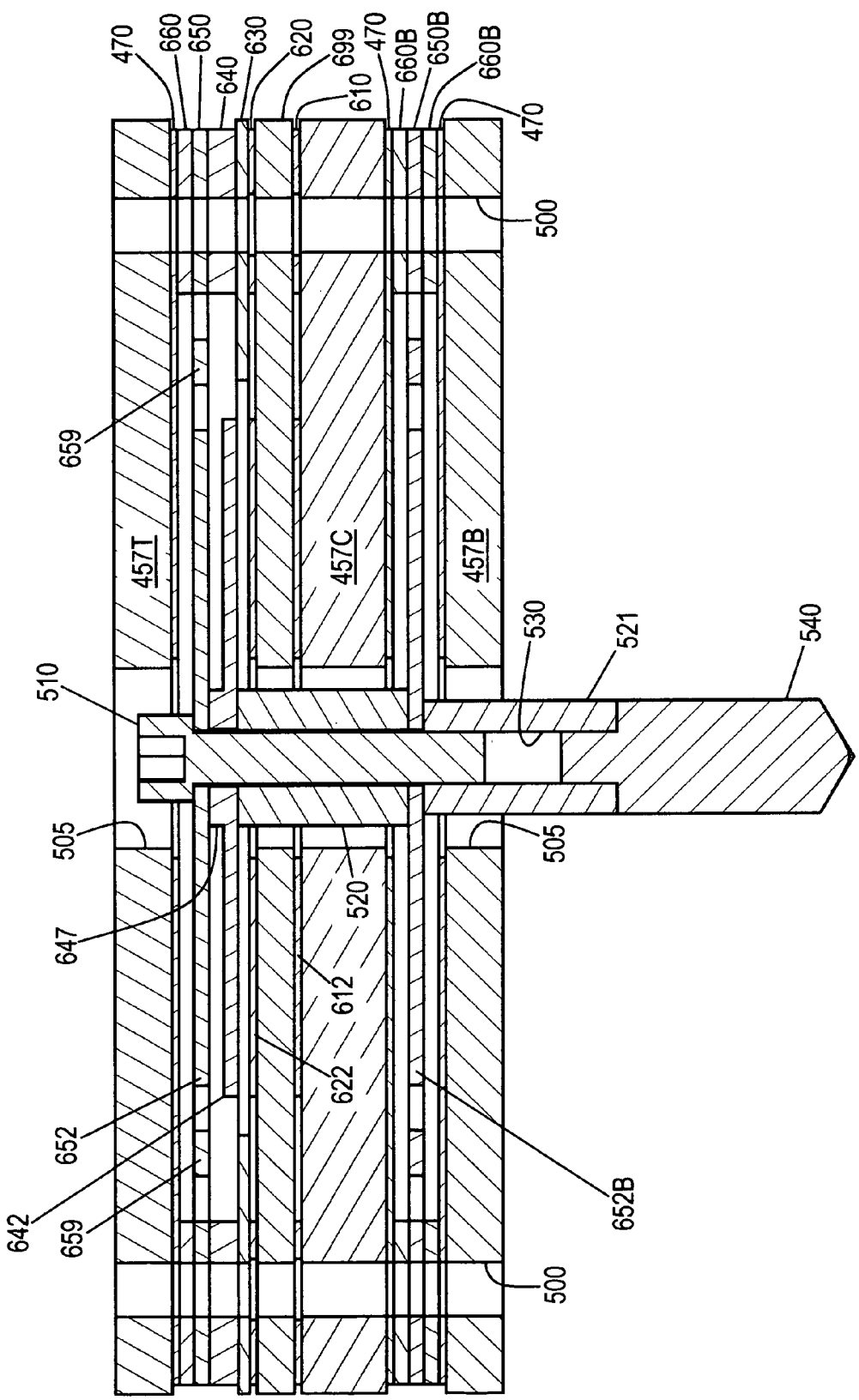
FIG. 24 is a sectional view of the transducer of the third embodiment.
Figure 25:
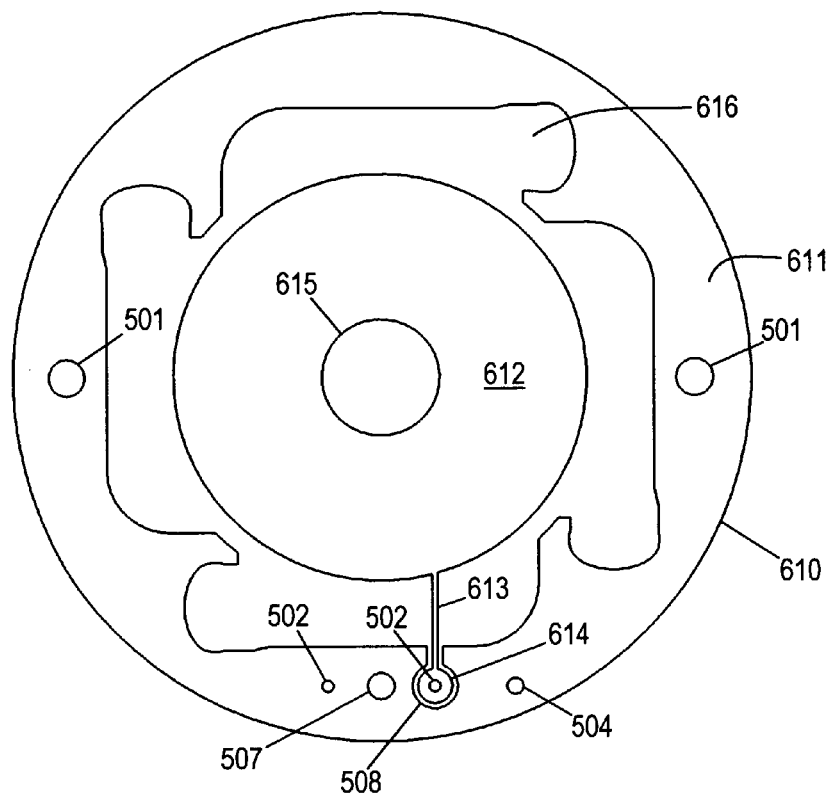
FIG. 25 is a plan view of the drive electrode of the transducer of the third embodiment.
Figure 26:
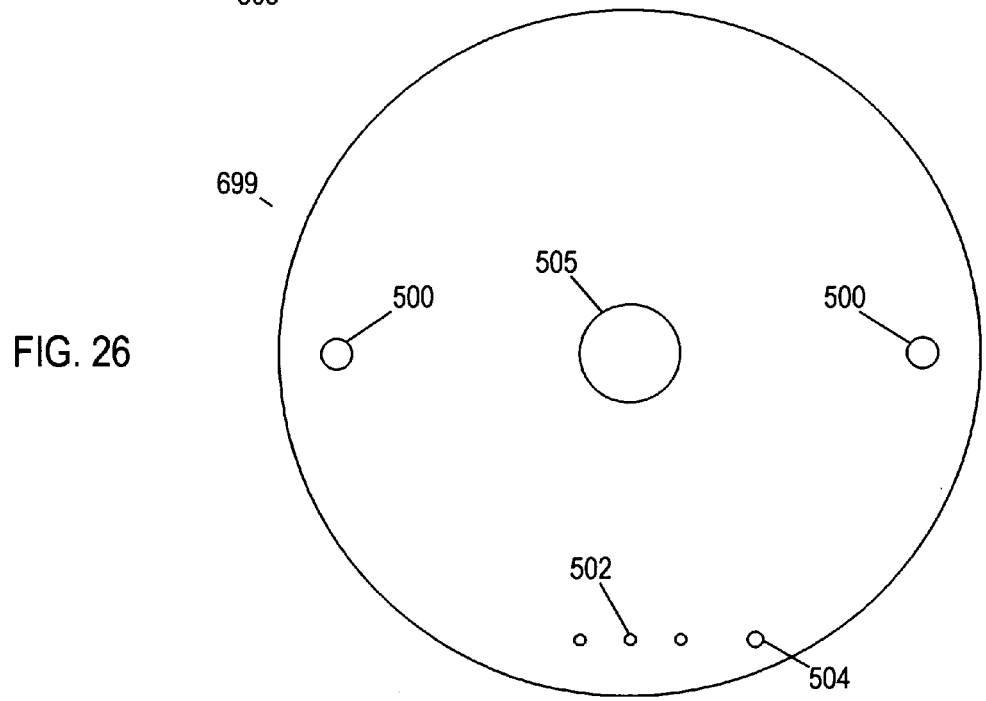
FIG. 26 is a plan view of the fixed electrode spacer of the transducer of the third embodiment.
Figure 27:
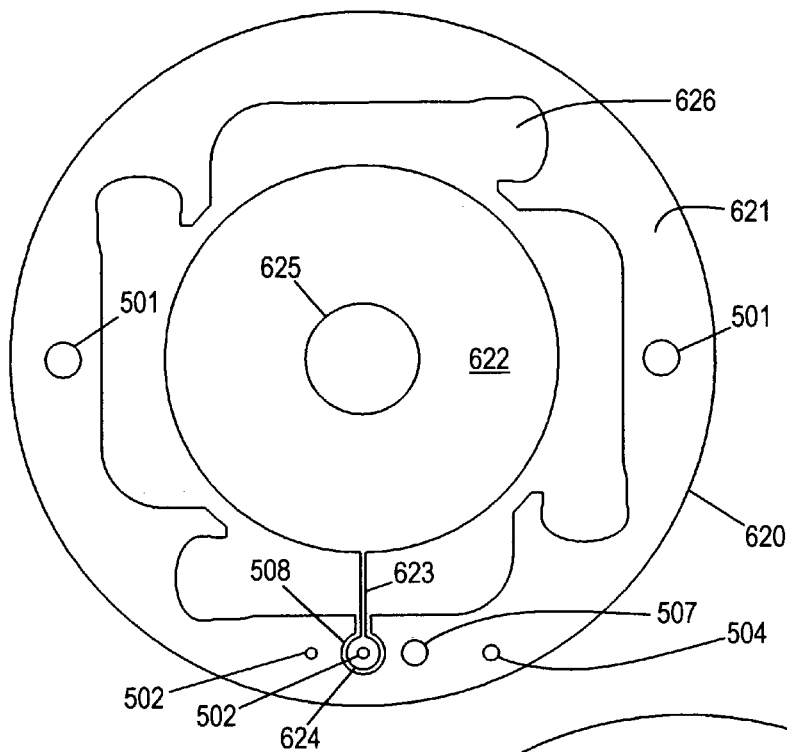
FIG. 27 is a plan view of the pickup electrode of the transducer of the third embodiment.

FIG. 24 shows a section view of the transducer. FIGS. 25-32 show individual layers of the transducer, to reveal details not visible in the section view. The description will start with drive electrode layer 610 (FIG. 25). Drive electrode layer 610 and pickup electrode layer 620 (FIG. 27) are preferably formed in place on dielectric spacer substrate 699 (FIG. 26), by etching thin copper foil that is laminated to both sides of substrate 699 by the supplier of the substrate material. Electrode 610, placed on the bottom of substrate 699, includes outer frame 611 and drive electrode 612 isolated from each other by opening 616. Drive electrode 612 includes central clearance hole 615, which is slightly larger than stem clearance hole 505 in substrate 699. Trace 613 connects pad 614 to drive electrode 612. Hole 502 in pad 614 accepts press in pin 524, which connects to the drive signal output of the drive circuit (not shown). Hole 508 isolates trace 613 and pad 614 from frame 611. Pickup electrode layer 620 includes frame 621 and pickup electrode 622 isolated from each other by opening 626. Pickup electrode 622 includes clearance hole 625 having the same diameter as hole 615. Trace 623 connects pad 624 to drive electrode 622. Hole 502 in pad 624 accepts press in pin 523, which connects to the pickup signal output of pickup electrode 622 to the input of the drive circuit (not shown). Hole 508 isolates trace 623 and pad 624 from frame 621. Clearance holes 501 are slightly larger than alignment holes 500 in substrate 699. Alignment holes 500 are used to align the various layers of the transducer during its assembly, in the same manner as the previous embodiments. Holes 500 may have a diameter of 0.0625 inch, for use with a standard 1/16 inch tooling pin (not shown). Pin clearance holes 507 prevent undesired contact between the press in pins and frames 611, 621. Press in pin 522 makes contact to frames 611, 621. The 0.025 square pin pressed into hole 504 connects all of the shields and frames of the transducer together, and hence to pin 522.

Figure 28:
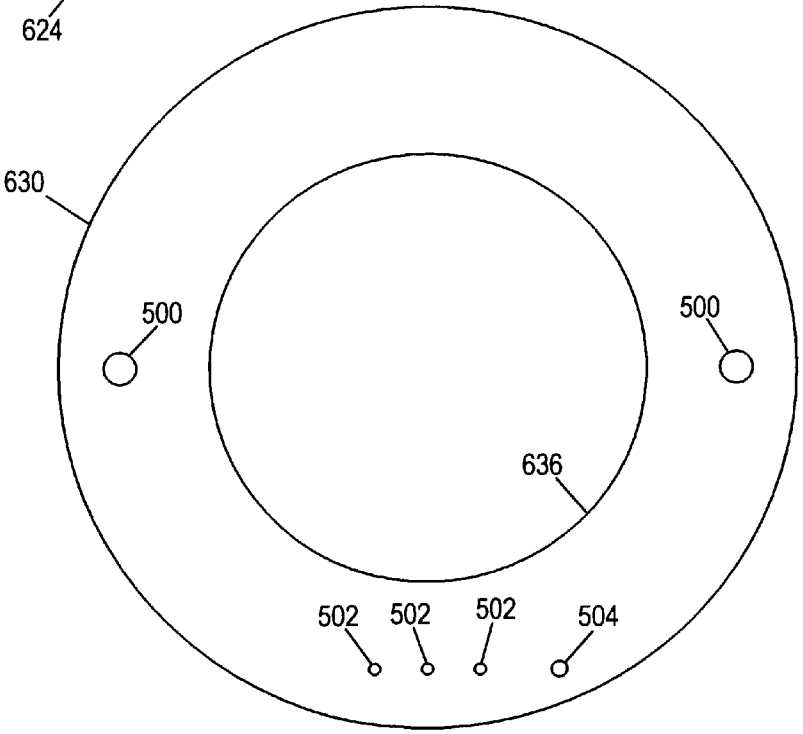
FIG. 28 is a plan view of the rotor plate to pickup electrode spacer of the transducer of the third embodiment.
Figure 29:
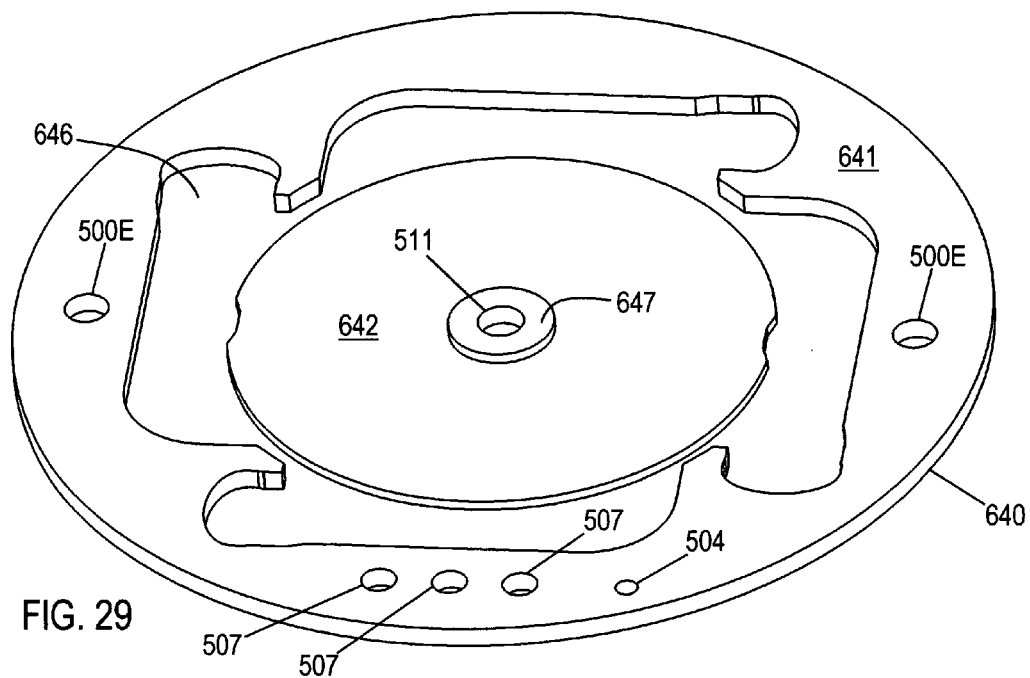
FIG. 29 is a plan view of the target electrode layer of the transducer of the third embodiment.
Figure 30:
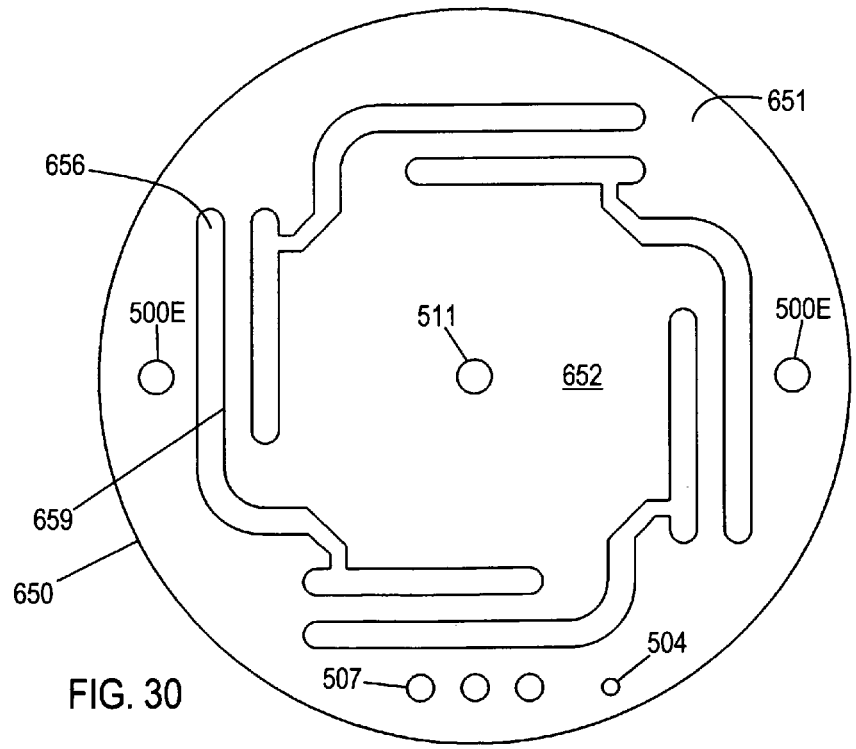
FIG. 30 is a plan view of the rotor plate layer of the transducer of the third embodiment.
Figure 31:
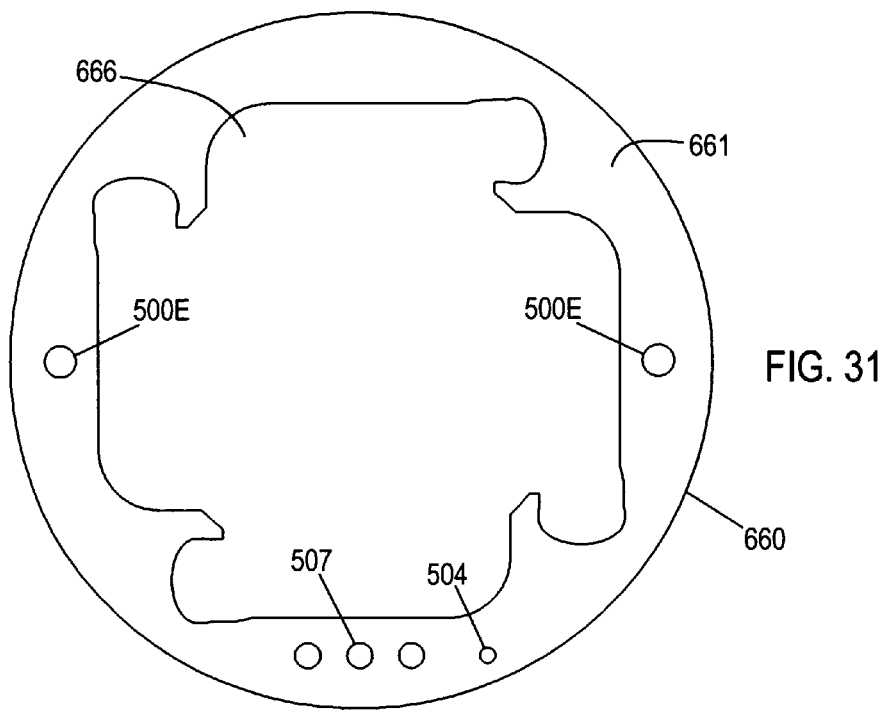
FIG. 31 is a plan view of the metal spacers of the transducer of the third embodiment.
Figure 32:
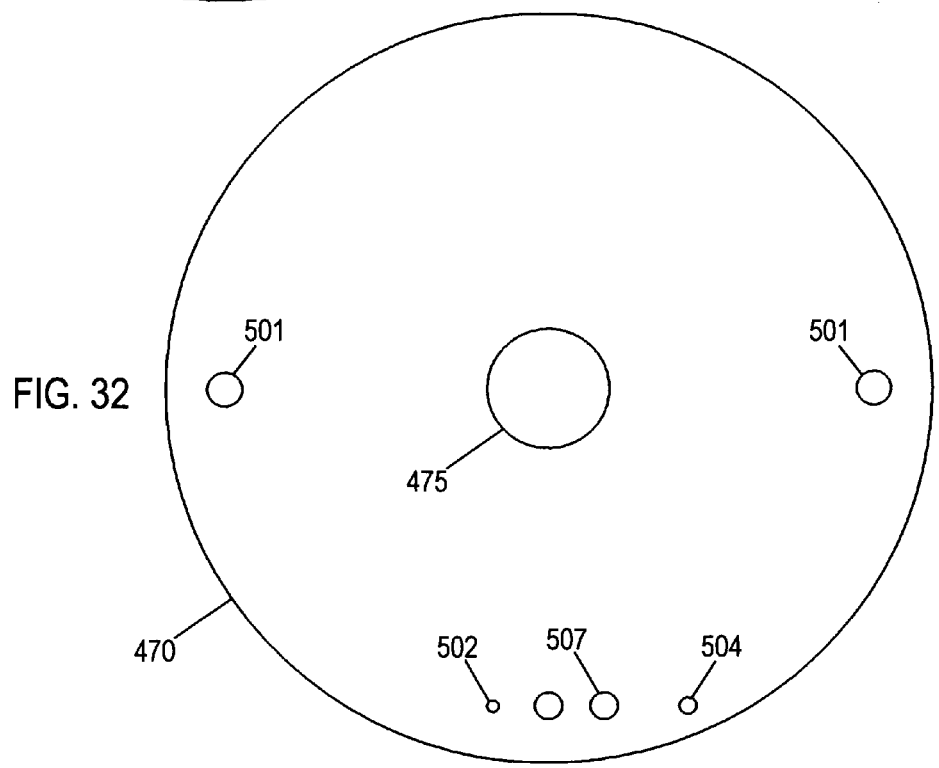
FIG. 32 is a plan view of the metal shield layers of the transducer of the third embodiment.

Gap spacer 630 (FIG. 28) sets the clearance between fixed pickup electrode 620 and movable target electrode 642 of target electrode layer 640 (FIG. 29). Pedestal 647 of target electrode 642 contacts rotor plate 652 of rotor plate layer 650 (FIG. 30). Screw 510 inserted through hole 511 of rotor plate 652 and target electrode 642, stem 520, lower rotor plate 652L, and tip mount nut 521 clamps target electrode 642 tightly against rotor plate 652. Nut 521 includes axial hole 530 which is threaded to accept both screw 510 and tip 540. Target electrode 642 is included because rotor plate 652 deflects under load, so that it has a curvature which increases with the applied load. This causes a small non-linearity in the output signal. If a non-linearity of about 1% is acceptable, the target electrode may be eliminated and the rotor plate used at the electrode, as in the first two embodiments. The first two embodiments did not require an unstressed target electrode because the laminated rotor plate structure of those embodiments was very stiff compared to the springs. Target electrode layer 640 is preferably formed by etching a sheet of brass or similar metal with a thickness of 0.031 inch thick, using a partial etch technique where one side of target electrode 642 is exposed to the etch, so that it is reduced in thickness to about 0.015 inch. Pedestal 647 is protected from etching so that it retains the full 0.031 inch thickness. Target electrode layer 640 includes frame 641 which includes etched alignment holes 500E, etched pin clearance holes 507, and ground contact hole 504. Opening 646 isolates the target electrode from the frame. Tabs (not shown) similar to tabs 89 (FIG. 6) of the previous embodiment may be used to hold the target electrode to the frame so the target electrode does not drop out during the etching process, or a plastic net may be used under the parts during etching to catch the target electrodes, eliminating the need for the tabs. If tabs are used, they must be removed by machining or some other means before the parts are assembled.

Rotor plate layer 650 is preferably constructed of a high strength Be—Cu alloy, by etching a flat sheet of the material with a thickness of 0.016 inch. To obtain a 1000 gram load capacity with a 0.01 inch displacement, the width of springs 659 may be 0.05 inch and the length, measured along the shortest straight section, may be 0.39 inch. Springs 659 have a fixed end attached to frame 651 and a movable end attached to rotor plate 652. Frame 651, springs 659, and rotor plate 652 are defined by slots 656. Alignment holes 500E are included for use during assembly.

Upper gap spacer 660 (FIG. 31), positioned immediately above rotor plate layer 650, provides space for target electrode 642 and rotor plate 652 to move in the upwards direction. Space in the downwards direction is provided by spacer 630. Spacer 660 includes frame 661, with inner opening 666. The shape of inner opening 666 is selected so that frame 661 provides optimal support to rotor plate layer 650, without interfering in the motion of springs 659 or plate 652. Alignment holes 500E are used in the assembly process. Spacer 660 is preferably constructed of metal, such as brass, and may be 0.016 inch thick. Lower gap spacer 630 may be constructed of G-10 printed circuit board substrate material, and may have a thickness of about 0.01 inch. As shown in FIG. 28, spacer 630 must be constructed of an electrically insulating material to prevent shorting the pickup signal on trace 623 and pad 624 to ground. If isolation channels such as those included in spacer 349L of the second embodiment are included (FIG. 15), the lower spacer may also be constructed of metal.

Shields 470 (FIG. 32) are included in three places to shield the drive and pickup electrodes from internal and external electrical disturbances. The shields are located on the bottom surface of top substrate 457T, the top surface of bottom substrate 457B, and the bottom surface of center substrate 457C. The shields include ground strap hole 504 which connects the shields and the frames together by means of the 0.025 inch square press in ground strap. Clearance holes 507 prevent shorting to drive and pickup signal pins 524, 523. Clearance holes 501 are slightly larger than alignment holes 500 drilled in the substrates, to prevent a burr at the edge of the hole. Clearance hole 475 at the center is slightly larger than stem clearance hole 505 for the same reason.

Referring again to FIG. 24, bottom rotor plate layer 650B, identical in construction to rotor plate layer 650, is located between spacers 660B, the spacers being identical to spacers 660. Plate 652B is clamped between nut 530 and stem 520 by screw 510. The bottom spacers are positioned between shields 470 attached to substrates 457C, 457B. The length of stem 520 must be equal to the total thickness of spacer 660B, shield 470, substrate 457C, drive electrode layer 610, electrode spacer 699, pickup electrode 620, bottom gap spacer 630, and the thickness of any adhesive used to hold the transducer layers together. Any error in the length of stem 520 will reduce the travel range of the transducer.

The transducer may be assembled by the following procedure. First, the individual parts are obtained or fabricated. The bottom cover consists of substrate 457B with shield 470 attached to the top surface. As described previously, shield 470 is preferably formed in place on substrate 457B by etching copper foil that is supplied already laminated to the substrate by the supplier. Holes 500, 505 are drilled in the substrate, and the round outer diameter is produced by a milling or routing operation. The other G-10 substrates are processed in the same manner, to obtain the center spacer consisting of substrate 457C with shield 470 attached to its bottom surface, the stator electrode assembly, consisting of electrode spacer substrate 699, with drive electrode layer 610 attached to the bottom surface and pickup electrode layer 620 attached to the top surface, and the top cover, shield 470 attached to the bottom surface of substrate 457T. The three shields are not absolutely necessary, but are preferably included. Gap spacer 630, constructed of G-10 material, is fabricated by drilling holes 500, and milling or routing inside hole 636 and the outer perimeter. Spacers 660 and 660B, rotor plate layers 650, 650B, and target electrode layer 640 are preferably fabricated by chemical etching. Screw 510 is purchased, and stem 520, nut 521 are fabricated by standard machine shop operations.

With all the components available, spacers 660B, 660, 630, and target electrode frame 641 are coated with an adhesive. This was performed as part of the assembly operation for the previous embodiments as well, but at the higher load, the properties of the adhesive and the procedures used to apply and control the adhesive thickness and uniformity are much more critical. The best adhesive found for this application is Scotchweld 2290, from 3M company. The manufacturer specifies that the adhesive should be applied to obtain a film thickness of 1 mil (25 μm), but for this application it was found that a much thinner application, of about 0.2 mil (5 μm), was much better. This is because the thinner the adhesive layer thickness, the less adhesive there is to contribute to creep and hysteresis at the adhesive joints. The manufacturer also specifies a B-stage (partial cure) of 45 min at 93° C. The B-stage cycle converts the adhesive coating to a dry, tack-free solid that can be easily handled, and the coated parts can be stored for up to 3 months before the final assembly operation. It was also found for this application that a much shorter B-stage cycle time of 10 minutes gave better results, as limiting the time to 10 minutes allows the adhesive film to flow during the final cure, reducing the adhesive film thickness in the final assembled transducer to about 0.1 mil (2.5 μm). Although the film thickness is only 1/10 that recommended by the manufacturer, there was no detectable negative effects on the strength of the bond.

With the spacers and target electrode frame coated with B-staged adhesive, the parts are ready for assembly. The parts are stacked from bottom to top, using tooling pins (not shown) inserted through alignment holes 500, 500E to align all of the layers. Stem 520 and target electrode 642 must be placed before rotor plate layer 650. screw 510 and nut 530 are installed to keep stem 520 and target electrode 642 in position. After all the layers are assembled together in a stack, a clamping force is applied to the top and bottom surfaces to force the stack tightly together. The adhesive is cured for 45 min at 177° C. under the clamping force pressure, then cooled to room temperature. The tooling pins are pressed out, holes 502 and 504 are drilled, pins 522, 523, 524 and the 0.025 square pin are pressed in, and the transducer is complete.

A final detail requiring explanation is the joint detail at the fixed ends of springs 659. This detail, as well as the adhesive application details already explained, are critical in eliminating creep and hysteresis of the adhesive joints near the fixed ends of the springs. This creep and hysteresis prevented previous transducers of a similar laminated layer construction from operating with acceptable stability at loads greater than about 20 grams. The problem is that the highest stress point in the spring is at its ends, and the fixed end is normally in close proximity to the adhesive joint bonding the rotor plate layer to the spacer layers. This close proximity results in a large stress in the adhesive, which being a polymer, is subject to creep and non-linear deformation at stress significantly below the ultimate strength of the adhesive. The strength of the 2290 adhesive is specified at 5000 psi. A goal in the design of this transducer was to limit the stress in the adhesive to 1000 psi.

Figure 33:
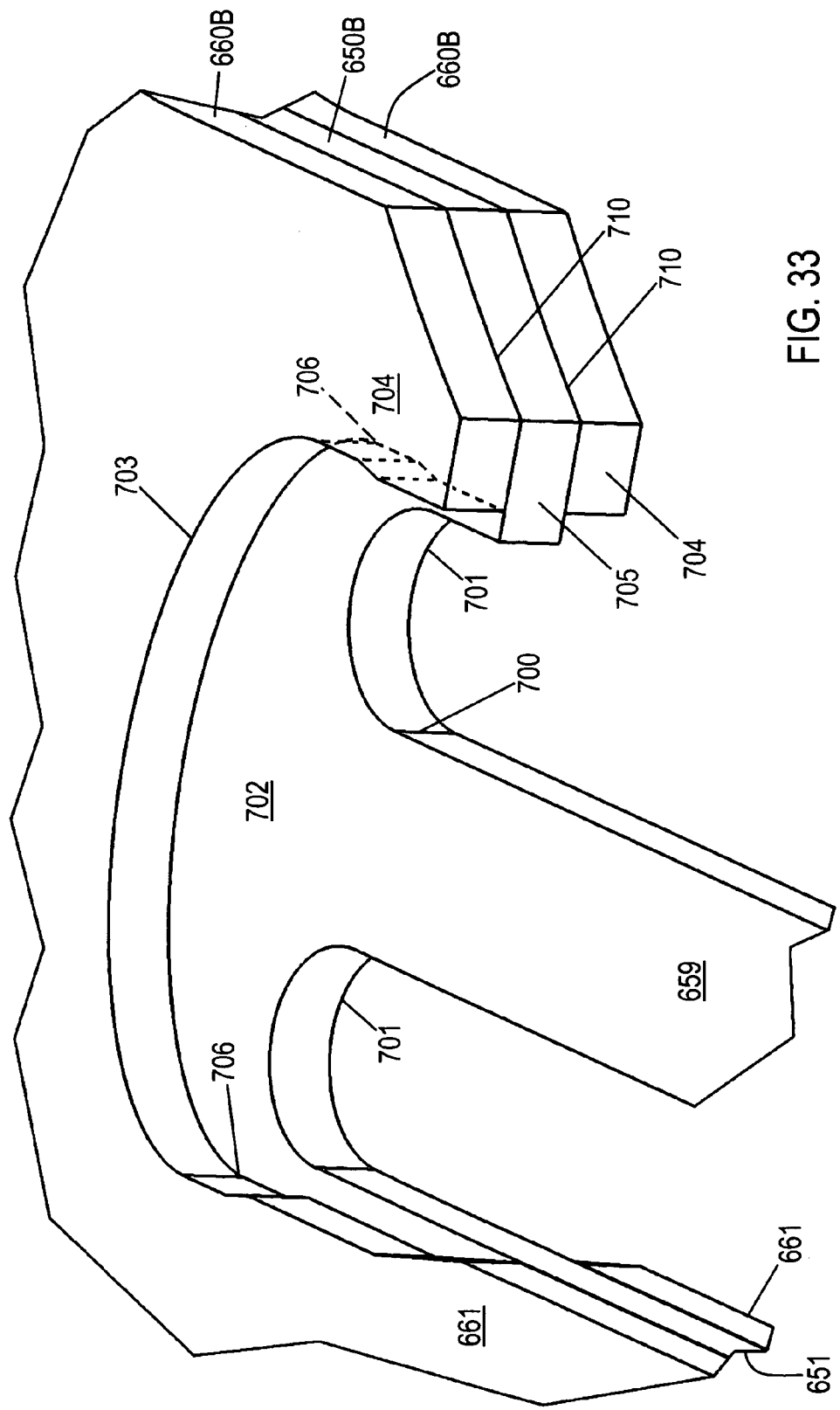
FIG. 33 is a close up perspective view of spring to frame joint detail in the transducer of the third embodiment.

FIG. 33 shows a perspective view of a magnified portion of the region near the fixed end of one of springs 659. Also included in the view is a small portion of frames 661 of spacers 660B and frame 651 of rotor plate layer 650B. All other components have been excluded. Base 700 of spring 659 is the region at the very end of the straight portion of the spring. Past base 700 is stress reduction region 702. Region 702 is substantially defined by semicircular arcs 701 of radius 0.025 inch (½ the width of spring 659), and elliptical arc 703, forming half of a complete ellipse, which is 0.168 inch wide along the long axis and has a half-width of 0.05 inch along the short axis (which is along the length of spring 659). Ends 706 of elliptical arc 703 are positioned 0.025 inch past base 700, so that ends 706 line up with the deepest intrusion of arcs 701 into region 702. Before arriving at the shape just described, arc 703 was tried as a semicircle with a radius of 0.075 inch (so that the diameter of the half circle was equal to the sum of the spring width and the diameter of the two arcs 701, as was done in the first two embodiments—see FIG. 5 and FIG. 6, for example). Analysis of the stress in adhesive bond lines 710 indicated a stress of about 2000 psi at the highest stress points under a 1000 gram load, but also large areas where the stress was much lower than 1000 psi. After much iterative design and analysis, the elliptical shape described was found to produce the most uniform stress, with a maximum value of about 1000 psi. Wrap around ears 704 of frame 661 and 705 of frame 651, which extend past arc 703, also reduce the bond line stress. Adhesive bond lines 710 do not have an obvious thickness in FIG. 33 because at about 2.5 mm it is too thin to draw. The stress reduction region features, and the modifications to the adhesive application and processing were extremely successful. A transducer was constructed with spacers 0.02 inch thick, so that larger than 1000 gram loads could be applied without the movable electrodes bottoming out on the fixed electrodes. The limit before bottoming out was about 2000 grams, and even at 2000 grams, or twice the intended load capacity, there was no significant hysteresis or creep. For improved thermal stability, this transducer can also be constructed using titanium alloy electrode layers, shields and spacers, and Macor or alumina or another ceramic with a TCE matched to the titanium for the substrates. Sufficient details regarding this were described for the previous embodiment to allow those skilled in the art to apply the same principles to the larger transducer. Other materials with lower CTE can also be used. Molybdenum has a lower TCE than titanium, and matches some of alumina formulations at the lower end of the TCE range. Another substrate material especially suitable for use with molybdenum metal electrodes is aluminum nitride, which has a CTE of 4.6 ppm/° C., closely matching molybdenum at 5 ppm/° C. Aluminum nitride, although an electrical insulator, has a very high thermal conductivity, similar to metals, so that heat applied to one region of the transducer is rapidly conducted throughout the entire structure, which minimizes distortion of the transducer by thermal gradients that can exacerbate thermal sensitivity.

Figure 34A:
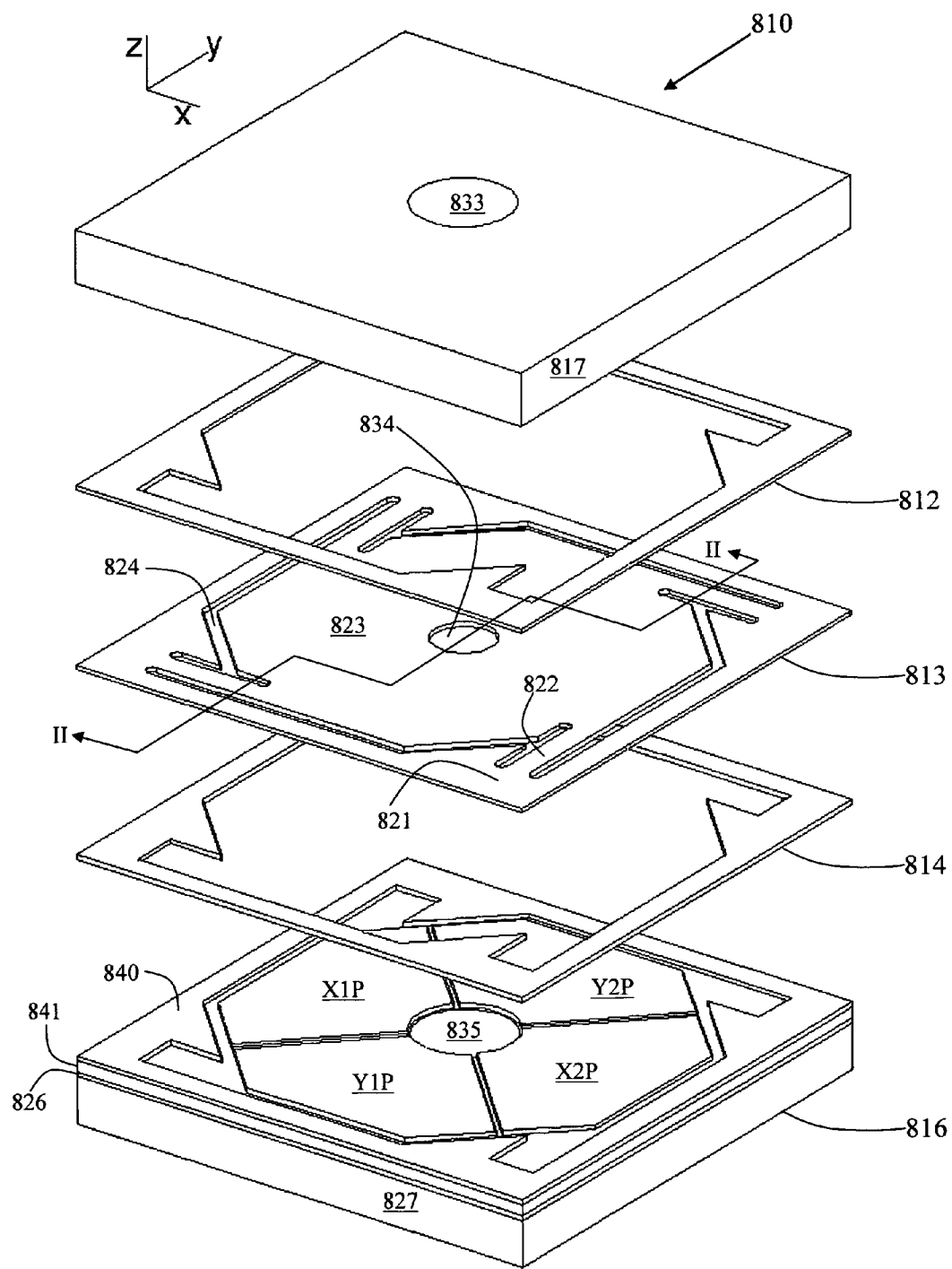
FIG. 34A is an exploded view of a fourth embodiment of the invention, providing operation in multiple directions.

FIG. 34A is an exploded view of the fourth embodiment of the current invention. In this embodiment, the transducer is responsive to force and/or displacement in more than one direction. Its construction is similar to that of the previously disclosed embodiments. The most significant difference is that the rotor is designed to tilt under the application of a side load. Note that many of the finer details included in the figures for the previous embodiments, such as partially etched hollow rotors and anti-buckling spring features are not shown here to simplify the figures, but that all of such previously disclosed features could be applied as desired.

Transducer assembly 810 includes upper substrate 817 including hole 833, upper spacer 812, rotor electrode assembly 813, lower spacer 814, and lower electrode assembly 816. Spacer 812 and substrate 817 are optional, but preferred to provide protection for rotor assembly 813. Rotor electrode assembly 813 is preferably fabricated by chemical etching slots 824 through a single sheet of high strength metal foil, but may be fabricated by any other suitable means as well. Rotor electrode assembly 813 includes target electrode 823 which is supported by springs 822 which are connected to outer frame 821. Target electrode 823 includes hole 834 for mounting probe tip 853 (see FIG. 35). Target electrode 823 is electrically grounded, Referring also to FIG. 34B, lower electrode assembly 816 includes substrate 827, spacer 826, drive plate electrodes X1D, X2D, Y1D and Y2D, dielectric spacer 841, pickup electrodes X1P, X2P, Y1P, Y2P, and spacer 840. Spacers 826 and 840 are preferably the same thickness as the electrodes they enclose, and may be fabricated with the electrodes by normal printed circuit board processes. Hole 835 extends through both substrate 827 and dielectric spacer 841. Dielectric spacer 841 and electrodes X1D, X1P form a fixed capacitor, which acts as a voltage divider along with the capacitance between electrode X1P and target electrode 823. For maximum sensitivity, the fixed capacitance should be equal to the nominal value of the variable capacitance. This may be obtained by setting the thickness of spacer 841 equal to the relative dielectric constant of itself (about 4, for G-10 material) times the thickness of spacer 814, which sets the nominal air gap between the pickup electrodes and the target electrodes. The X2D/X2P, Y1D/Y1P, and Y2D/Y2P electrode pairs operate in the same manner. Substrates 817, 827, and dielectric spacer 841 are preferably fabricated from electrically insulating material such as G-10 printed circuit board laminate, or a ceramic material. Spacers 812, 814 may be either insulating or conducting. It is convenient to fabricate them by chemical etching of metal foil in the same manner as the electrodes.

Figure 35:
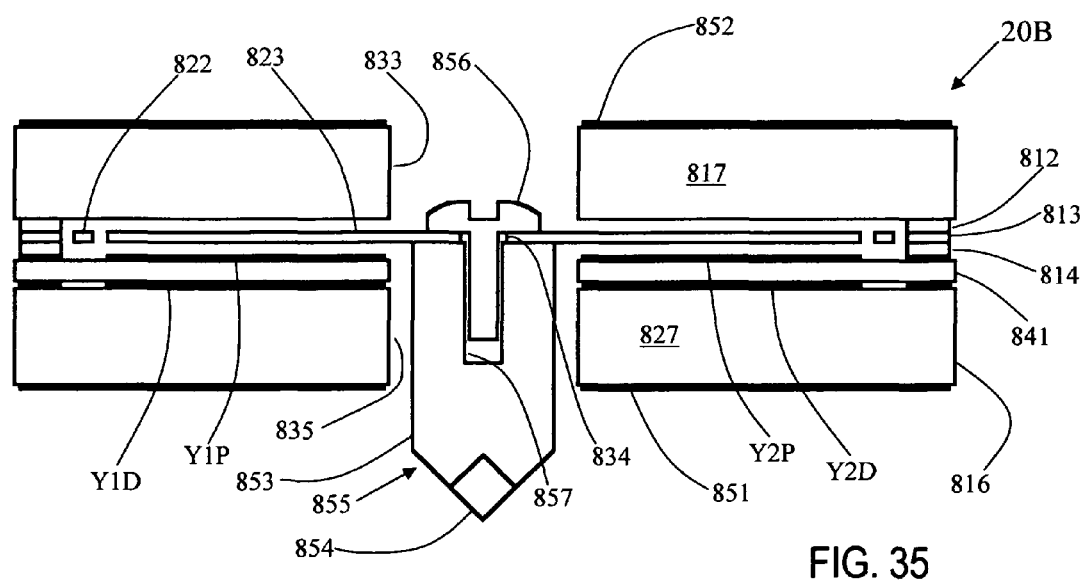
FIG. 35 is a sectional view of the transducer of the fourth embodiment.

FIG. 35 is a sectional view of the transducer depicted in FIG. 34A, viewed through the section indicated by Roman numeral II in FIG. 34A. The transducer may include grounded electrical shields 851, 852, and a probe assembly 855 for interacting with a sample. The probe assembly consists of a probe body 853, probe tip 854 and mounting hole 857. Screw 856 is used to secure the probe to the target electrode plate 823. In this configuration the probe body 853 is directly in contact with target electrode 823, but since target electrode 823 is grounded, probe body 853 is not required to be a non-conductive material. The separation of the drive electrodes Y1D, Y2D from the pickup electrodes Y1P, Y2P by dielectric spacer 841 is also visible.

Figure 34B:
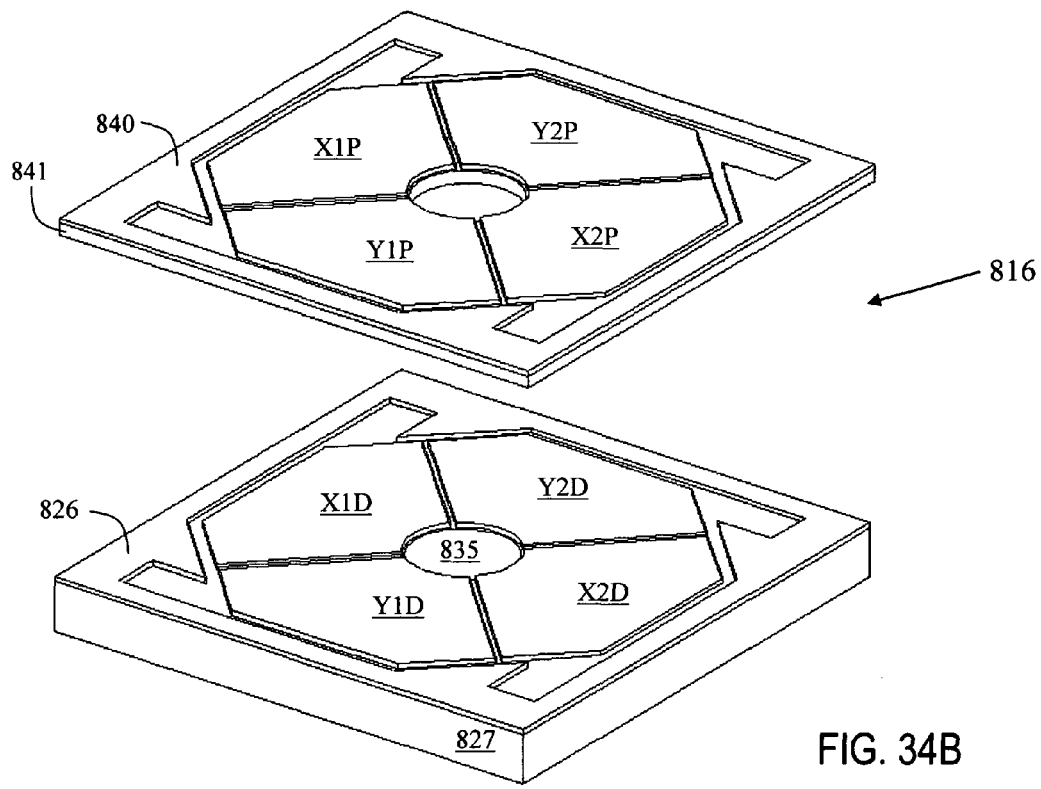
FIG. 34B is another exploded view of the fourth embodiment, showing details not visible in FIG. 34A.

Referring to FIGS. 34A, 34B, and 35, a force in the X-axis direction applied to the end of probe 855 will cause a small angular rotation of target electrode 823, so that the target electrode is closer to pickup electrode X1P, and farther away from pickup electrode X2P. This reduces the voltage on pickup electrode X1P and increases the voltage on electrode X2P. The drive circuitry uses the difference between the two voltage signals to determine the X-axis force.

The operation for an applied Y axis force is the same as just described, except that the relevant pickup electrodes are now Y1P and Y2P. The Z axis force is determined by summing all four pickup electrode signals.

The electrical connections from the circuitry to the transducer drive electrodes and pickup electrodes have not been shown in the transducer figures as there are a number of different possibilities for doing so that are well known to those skilled in the electronics circuit field, and to avoid unnecessarily complicating the figures. The same electrical interconnection techniques shown for the previous embodiments may of course be duplicated for this embodiment. There are many possible methods of assembling the components of transducer 810, but one preferred method is to fabricate lower electrode assembly 816 using industry standard multilayer printed circuit board fabrication processes, using similar but simpler printed circuit board fabrication techniques for upper substrate 817, and etching rotor assembly 813 as well as spacers 812, 814 from metal foil. Spacers 812, 814 may be coated with adhesive, and the entire assembly stacked together and laminated in the same manner as previously disclosed for other embodiments.

It should be noted that if measurement is only required in two directions, such as in the X and Z axis, the transducer could be constructed with only two drive/pickup electrode pairs. Also, it is possible to operate in all three directions using only three drive/pickup electrode pairs, but decoding the signals onto X and Y-axes would be more complicated.

Several specific embodiments have been described, giving specific details including dimensions, design details, process information, and suggested materials. These specific details in no way limit the scope of the invention. Likewise, those skilled in the art will realize many small changes in the shape, size, and position of components that can be made without exceeding the scope of this invention.

I claim:

1. A capacitive transducer responsive to force and/or displacement in at least two directions comprising:
    an electrically conductive grounded target electrode movably supported by flexible springs;
    at least first and second position sense electrode assemblies, each of said assemblies including at least a first electrically conductive drive electrode, at least a first electrically conductive pickup electrode and a first dielectric spacer, the dielectric spacer being positioned between the pickup electrodes and the drive electrodes; and
    first spacer means separating said target electrode from each said pickup electrode by a pre-determined spacing.

2. The transducer of claim 1, further including a probe tip for transmitting a force or displacement between a sample and said target electrode.

3. The transducer of claim 2, wherein output signals from the pickup electrodes are combined to generate a first output responsive to force or displacement in a first direction and a second output responsive to force or displacement in a second direction.

4. A capacitive transducer responsive to force and/or displacement in at least three directions comprising:
    an electrically conductive grounded target electrode movably supported by flexible springs;

first, second and third position sense electrode assemblies, each of said assemblies including at least a first electrically conductive drive electrode, at least a first electrically conductive pickup electrode and a first dielectric spacer, the dielectric spacer being positioned between the pickup electrodes and the drive electrodes; and first spacer means separating said target electrode from each said pickup electrode by a pre-determined spacing.

5. The transducer of claim 4, further including a probe tip for transmitting a force or displacement between a sample and said target electrode.

6. The transducer of claim 5, wherein output signals from the pickup electrodes are combined to generate a first output responsive to force or displacement in a first direction, a second output responsive to force or displacement in a second direction, and a third output responsive to force or displacement in a third direction.

7. A capacitive transducer responsive to force and/or displacement in at least three directions comprising:

an electrically conductive grounded target electrode movably supported by flexible springs;

first, second, third and fourth position sense electrode assemblies, each of said assemblies including at least a first electrically conductive drive electrode, at least a first electrically conductive pickup electrode and a first dielectric spacer, the dielectric spacer being positioned between the pickup electrodes and the drive electrodes; and first spacer means separating said target electrode from each said pickup electrode by a pre-determined spacing.

8. The transducer of claim 7, further including a probe tip for transmitting a force or displacement between a sample and said target electrode.

9. The transducer of claim 8, wherein output signals from the pickup electrodes are combined to generate a first output responsive to force or displacement in a first direction, a second output responsive to force or displacement in a second direction, and a third output responsive to force or displacement in a third direction.

10. The transducer of claim 1, further including:

a lower substrate supporting said position sense electrode assembly;

an upper substrate; and second spacer means separating the upper substrate from each said pickup electrode by a pre-determined distance.

11. The transducer of claim 4, further including:

a lower substrate supporting said position sense electrode assembly;

an upper substrate; and second spacer means separating the upper substrate from each said pickup electrode by a pre-determined distance.

12. The transducer of claim 7, further including:

a lower substrate supporting said position sense electrode assembly;

an upper substrate; and second spacer means separating the upper substrate from each said pickup electrode by a pre-determined distance.

* * * * *